United States Patent
Brass et al.

(10) Patent No.: US 7,614,663 B2
(45) Date of Patent: Nov. 10, 2009

(54) SWIVEL ASSEMBLIES FOR CONDUITS CARRYING PRESSURIZED FLUIDS TO OR FROM AIR CONDITIONING OR REFRIGERATION SYSTEMS

(75) Inventors: Jack Brass, Toronto (CA); Steven M Knowles, North Manchester, IN (US); Gregory R. W. McEwan, Warkworth (CA)

(73) Assignee: Brasscorp Limited, North York (CA)

( * ) Notice: Subject to any disclaimer, the term of this patent is extended or adjusted under 35 U.S.C. 154(b) by 370 days.

(21) Appl. No.: 10/578,142

(22) PCT Filed: Nov. 1, 2004

(86) PCT No.: PCT/CA2004/001904

§ 371 (c)(1),
(2), (4) Date: May 3, 2006

(87) PCT Pub. No.: WO2005/043026

PCT Pub. Date: May 12, 2005

(65) Prior Publication Data

US 2007/0046020 A1      Mar. 1, 2007

Related U.S. Application Data

(60) Provisional application No. 60/516,297, filed on Nov. 3, 2003, provisional application No. 60/516,728, filed on Nov. 4, 2003, provisional application No. 60/609,269, filed on Sep. 14, 2004.

(51) Int. Cl.
   *F16L 27/00*      (2006.01)
(52) U.S. Cl. ................. 285/147.1; 285/272; 285/148.19
(58) Field of Classification Search ................. 285/273, 285/272, 144.1, 145.2, 145.3, 147.3, 148.14, 285/148.15, 148.21
See application file for complete search history.

(56) References Cited

U.S. PATENT DOCUMENTS

| | | | | |
|---|---|---|---|---|
| 927,659 | A | * | 7/1909 | Kilpatrick ................. 285/272.1 |
| 1,685,351 | A | * | 9/1928 | Davis .................... 285/148.15 |
| 1,705,443 | A | * | 3/1929 | Edelmann .............. 285/148.15 |
| 2,745,682 | A | * | 5/1956 | Chevallier ................ 285/272.1 |
| 2,831,709 | A | * | 4/1958 | Shaw et al. .................. 285/185 |
| 3,558,163 | A | * | 1/1971 | Moore et al. ............. 285/147.3 |
| 3,736,986 | A | | 6/1973 | Magdars |
| 3,973,790 | A | * | 8/1976 | Wenzel ........................ 285/61 |
| 4,239,262 | A | | 12/1980 | Krupp et al. |
| 4,437,690 | A | | 3/1984 | Drath |
| 4,615,547 | A | | 10/1986 | Sutcliffe et al. |
| 5,056,563 | A | * | 10/1991 | Glossop ...................... 137/883 |
| 5,178,422 | A | * | 1/1993 | Sekerchak ............... 285/144.1 |

(Continued)

*Primary Examiner*—David E Bochna
(74) *Attorney, Agent, or Firm*—Dowell & Dowell, P.C.

(57) ABSTRACT

A conduit is provided for use in association with an air conditioning or refrigeration system. The conduit has first and second conduit portions, and a swivel providing fluid communication between the first and second conduit portions. The swivel permits rotational movement of the first conduit portion relative to the second conduit portion. The swivel is constrained to prevent linear movement between the first and second portions at the swivel. The conduit also has a fitting for external connection of the conduit to a pressure port of an air conditioning or refrigeration system. The conduit provides sealed fluid communication from the first conduit portion, swivel and second conduit portion to the air conditioning or refrigeration system when the fitting is connected to the air conditioning or refrigeration system. There are also conduit adapters, injection hose assemblies, charging manifolds with swivels, and methods of utilizing such conduits and swivels.

8 Claims, 20 Drawing Sheets

U.S. PATENT DOCUMENTS

| | | | | |
|---|---|---|---|---|
| 5,275,444 A * | 1/1994 | Wythoff | | 285/90 |
| 5,333,467 A | 8/1994 | Pearl, II et al. | | |
| 5,372,389 A * | 12/1994 | Tam et al. | | 285/94 |
| 5,405,173 A * | 4/1995 | Goughneour | | 285/272.1 |
| 5,478,121 A * | 12/1995 | Foti | | 285/144.1 |
| 5,538,296 A | 7/1996 | Horton | | |
| 5,839,764 A * | 11/1998 | Heidelberger | | 285/276 |
| 5,975,490 A | 11/1999 | Essman | | |
| 6,058,975 A * | 5/2000 | Hui-Chen | | 137/883 |
| 6,196,016 B1 | 3/2001 | Knowles et al. | | |
| 6,250,603 B1 | 6/2001 | Knowles et al. | | |
| 6,296,228 B1 | 10/2001 | Knowles et al. | | |
| 6,505,861 B2 | 1/2003 | Butterfield et al. | | |
| 6,517,356 B1 | 2/2003 | Smith | | |
| 6,539,970 B1 | 4/2003 | Knowles et al. | | |
| 6,604,543 B1 | 8/2003 | Guo | | |
| 6,619,570 B1 * | 9/2003 | Ericksen et al. | | 239/532 |
| 6,752,433 B2 | 6/2004 | Frost | | |
| 7,237,808 B2 * | 7/2007 | Porter | | 285/261 |

* cited by examiner

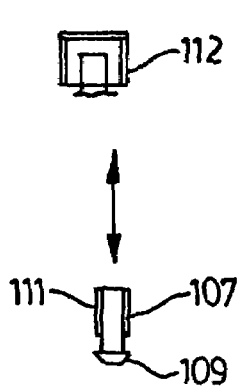
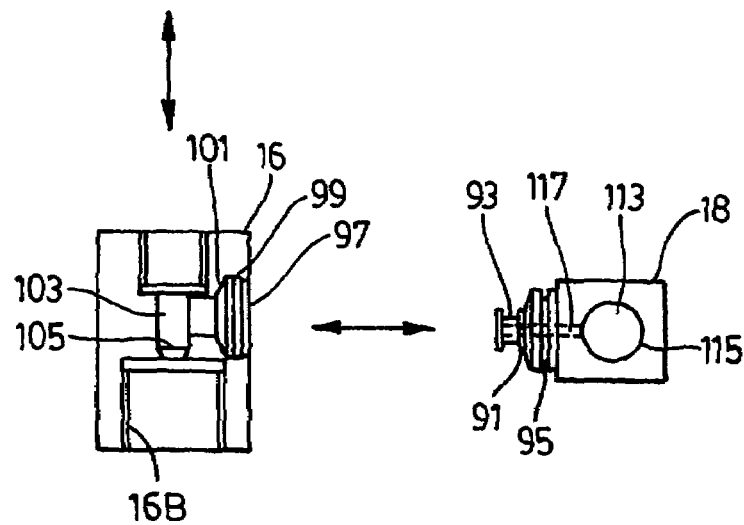
FIG. 24
FIG. 26
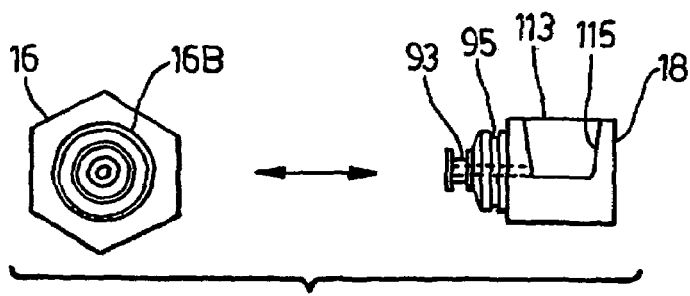
FIG. 25
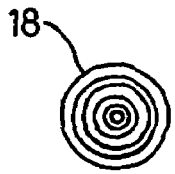
FIG. 27

SWIVEL ASSEMBLIES FOR CONDUITS CARRYING PRESSURIZED FLUIDS TO OR FROM AIR CONDITIONING OR REFRIGERATION SYSTEMS

This application is a national phase entry of International Application PCT/CA2004/001904, with an international filing date of 1 Nov. 2004, which claims the benefit of the filing date of U.S. Patent Application No. 60/516,728 filed 4 Nov. 2003 and Application No. 60/516,297 filed 3 Nov. 2003 under the title INJECTION HOSE ASSEMBLY WITH SWIVEL, and Application No. 60/609,269 filed 14 Sep. 2004 under the title SWIVEL ASSEMBLIES FOR CONDUITS CARRYING PRESSURIZED FLUIDS TO OR FROM AIR CONDITIONING OR REFRIGERATION SYSTEMS. The content of the above applications is hereby expressly incorporated by reference into the detailed description hereof.

TECHNICAL FIELD

The invention relates to conduits for carrying pressurized fluids to or from an air conditioning or refrigeration system for the repair, maintenance or charging of such system. Such conduits might be used, for example, when injecting refrigerant, liquid dyes, lubricants, additives or other liquids into air conditioning or refrigeration systems, or when drawing a vacuum from air conditioning or refrigeration systems.

BACKGROUND ART

It is often required to carry pressurized fluid from or to an air conditioning or refrigeration system. For example, during initial charging or recharging of an air conditioning or refrigeration system refrigerant is added to the system. Typically, a refrigerant charging station is connected through a charging manifold to the air conditioning or refrigeration system. The manifold permits separate control of fluid flow from the charging station to a high pressure side port of the system and to a low pressure side port of the system.

The manifold typically also has a high side pressure gauge and a low side pressure gauge for providing pressure information to an operator. The manifold can be placed remote from the charging station and near to system for adjustment by the operator when in use. Continuing with the charging manifold example, the charging manifold is connected through hoses and fittings to the charging station and to the system. The fittings are generally connected to one another by threaded connections or quick disconnects. Other components can be utilized with the charging manifold. For example, an injector can be connected between the charging station and the system using additional fittings and hoses. Liquid dyes, lubricants, additives or other liquids can be injected into the air conditioning or refrigeration system using pressure from the charging station.

The various components that are directly or indirectly connected to the system make up an enclosed conduit for carrying fluids to the system. There are many other forms of such conduits. For example, manual injectors are in widespread use. These injectors are connected through hoses and fittings to the air conditioning or refrigeration system, and manual force is used to inject liquids from the injector into the system. Injection methods are described in many patents, see for example U.S. Pat. No. 6,263,778 entitled Precision Liquid Injection System issued Jun. 24, 2001 to Brass and Knecht describing a liquid injection device and co-pending International patent application number PCT/CA2004/00014 of Brass entitled Manual Liquid Metering Device and Cartridge filed 29 Jan. 2004.

Where a connection can be made between an injector and an air conditioning system with the injector and system in good alignment at the connection, and sufficient working space to operate the injector then, such a connection can be used. An example of a direct injection connection is described in U.S. Pat. No. 5,673,722 to Brass entitled Liquid Injection Device, System and Method issued 7 Oct. 1997.

The components in the conduit are typically made from metal, rubber or plastic sufficient to withstand pressures to be encountered in use. The materials must also be compatible with the fluids to be used.

Typically, there will be insufficient working space about the injector near the system to make a direct connection. Hoses are typically necessary to allow a remote fluid connection to be made to an air conditioning or refrigeration system, to allow access to a system in a confined location, or to allow an operator to work in a comfortable position.

Alignment of components in a conduit often requires bending and twisting of the conduit. It is usually the hoses that permit such twisting and bending. When using a charging manifold, the manifold may rotate and tilt on its support to permit some of the bending and twisting. In automotive applications, the manifold has a hanger and is typically hung from a rack at the charging station and, when required, hung from the underside of the hood of a car where the gauges can be viewed by an operator and the operator can actuate valves in the manifold to control the fluid flow between the charging station and the system. Rotation and tilting of the manifold can make it difficult for an operator to operate efficiently, as the operator may need to change positions in order to view the gauge, or reach out to tilt the gauge for proper viewing.

In some cases, a connection between fittings may have some play in order to provide some flexibility; however, the pressure in the conduit works against this, and stress on the fittings is undesirable. The pressure in the conduit can also work against twisting and bending of hoses in the conduit.

Considering again the need for conduits to carry pressurized fluids to and from air conditioning and refrigeration systems, such systems often leak. This leakage can reduce the efficiency of the system. A substantial loss of refrigerant and lubricant can also cause premature failure including compressor burnout. Also, refrigerants escaping into the environment are known to cause ozone depletion and, possibly, lead to global warming. Leak detection is generally performed by injecting a fluorescent dye into the air conditioning or refrigeration system.

Typically, injectors require a hose to convey the liquid from the injector reservoir or cartridge to the air conditioning or refrigeration system. For example, referring to FIGS. 1 to 4, a hose assembly for R134a systems has a 90 degree R134a female quick disconnect fitting 1 that is usually connected to a low side service port of the air conditioning system. These fittings 1 typically have an automatic shutoff when removed from the air conditioning system after the injection process is completed. Hose 2 is used to convey the liquid. Interface fitting 3 is used to connect the hose assembly to an injector reservoir or cartridge. Fitting 3 may be a screw on or quick disconnect type interface and may also include a check valve embodiment to prevent back pressure from the air conditioning system. The check valve will also prevent liquid from exiting the hose when removed from the injector.

Referring to FIG. 2, an R12/R22 embodiment similar to the hose assembly of FIG. 1 may be made by replacing fitting 1 with an R12/R22 fitting 4. It is to be recognized that fittings compatible with R12 and R22 refrigerant systems will also be compatible with many other types of refrigerant systems that use similar fittings. Hose assemblies for other types of systems that are not compatible with R134A or R12/R22 fittings can be easily made by replacing the fitting 1 or 4 with a compatible fitting.

Referring to FIG. 3, an adaptor fitting may be used to convert an R134a hose assembly as in FIG. 1 into an R12 or R22 hose assembly. In this embodiment a male quick disconnect 5 is fitted into fitting 1 of FIG. 1 in order to perform the conversion.

Referring to FIG. 4 there are many different injectors that can be combined with the type of hose described above. An example injector 11 has a spindle 6 which, when turned in a clockwise direction through injector body 7, pushes a piston in a cartridge 8 in a forward direction. Pushing the piston forward, forces the liquid in the cartridge 8 to open a check valve 9 further conveying the liquid through flexible hose 10 and further past R134a female fitting 12 into an air conditioning or refrigeration system. Total length 11 of an injection system can be up to 22 inches or more.

The inventors of the instant application have recognized these difficulties and that improvements to conduits for connection to an air conditioning or refrigeration system are desirable.

DISCLOSURE OF THE INVENTION

In a first aspect the invention provides a conduit for use in association with an air conditioning or refrigeration system. The conduit has a first conduit portion, a second conduit portion, and a swivel providing fluid communication between the first conduit portion and the second conduit portion. The swivel permits rotational movement of the first conduit portion relative to the second conduit portion. The swivel is constrained to prevent linear movement between the first and second portions at the swivel. The conduit also has a fitting for external connection of the conduit to a pressure port of the air conditioning or refrigeration system, the fitting for fluid communication with the first conduit portion and the second conduit portion. The conduit provides sealed fluid communication from the first conduit portion, swivel and second conduit portion to the air conditioning or refrigeration system when the fitting is connected to the air conditioning or refrigeration system.

The swivel may be an inline swivel that provides fluid communication between the first conduit portion and the second conduit portions such that the first conduit portion and the second conduit portion share one fluid path axis immediately adjacent the swivel. The swivel may permit relative rotation between the first conduit portion and the second conduit portion about the fluid path axis.

The swivel may be an inline normal swivel that provides fluid communication between the first conduit portion and the second conduit portion such that the first conduit portion has a first conduit fluid path and the second conduit portion has a second conduit fluid path, and the first conduit fluid path is normal to the second conduit fluid path. The swivel may permit relative rotation of the first conduit about the first conduit fluid path and relative rotation of the second conduit portion about the first conduit fluid path.

The swivel may be an aligned dual normal swivel that provides fluid communication between the first conduit portion and the second conduit portion such that the first conduit portion has a first conduit fluid path and the second conduit portion has a second conduit fluid path. In an aligned dual normal swivel, the first conduit fluid path is in the same plane as the second conduit fluid path, and the swivel permits relative rotation of the first conduit and the second conduit about an axis normal to the first conduit fluid path and the second conduit fluid path.

The swivel may be an offset dual normal swivel that provides fluid communication between the first conduit portion and the second conduit portion such that the first conduit portion has a first conduit fluid path and the second conduit portion has a second conduit fluid path. In the offset dual normal swivel the first conduit fluid path and the second conduit fluid path are in non-intersecting parallel planes, and the swivel permits relative rotation of the first conduit and the second conduit about an axis normal to the first conduit fluid path and the second conduit fluid path.

The swivel may be an inline aligned dual normal swivel that provides fluid communication between the first conduit portion and the second conduit portion such that the first conduit portion has a first conduit fluid path and the second conduit portion has a second conduit fluid path. In an inline dual normal swivel the first conduit fluid path is in the same plane as the second conduit fluid path, and the swivel permits relative rotation of the first conduit about the first conduit fluid path and relative rotation of the first conduit and the second conduit about an axis normal to the first conduit fluid path and the second conduit fluid path.

The swivel may be a ball and socket swivel.

The conduit may have a charging manifold body, high pressure side hose, low pressure side hose, charging hose, charging station, and a plurality of swivels, including the swivel. A first swivel of the plurality of swivels may permit relative rotation of the high pressure side hose and the charging manifold body, a second swivel of the plurality of swivels may permit relative rotation of the low pressure side hose and the charging manifold body.

The high pressure side hose may have a high pressure fluid path and the first swivel may permit relative rotation of the high pressure side hose and the charging manifold body about an axis normal to the high pressure fluid path adjacent the first swivel, and the low pressure side hose may have a low pressure fluid path and the second swivel may permit relative rotation of the low pressure side hose and the charging manifold body about an axis normal to the low pressure fluid path adjacent the second swivel.

The first swivel may also permit relative rotation of the high pressure side hose and the charging manifold body about an axis inline with the high pressure fluid path adjacent the first swivel, and the second swivel permits relative rotation of the low pressure side hose and the charging manifold body about an axis inline with the low pressure fluid path adjacent the second swivel.

The conduit may have a charging manifold body, high pressure side hose, high pressure gauge, low pressure side hose, low pressure gauge, charging hose, charging station, and a plurality of swivels, including the swivel. A first swivel of the plurality of swivels may permit relative rotation of the high pressure gauge and the charging manifold body, a second swivel of the plurality of swivels may permit relative rotation of the low pressure gauge and the charging manifold body.

The high pressure gauge has a high pressure fluid path and the first swivel may permit relative rotation of the high pressure gauge and the charging manifold body about an axis normal to the high pressure fluid path adjacent the first swivel. The low pressure gauge may have a low pressure fluid path. The second swivel may permit relative rotation of the low pressure gauge and the charging manifold body about an axis normal to the low pressure fluid path adjacent the second swivel.

The first swivel may permit relative rotation of the high pressure gauge and the charging manifold body about an axis inline with the high pressure fluid path adjacent the first swivel. The second swivel may permit relative rotation of the low pressure gauge and the charging manifold body about an axis inline with the low pressure fluid path adjacent the second swivel.

The first swivel may be a ball and socket swivel and the second swivel may be a ball and socket swivel.

The first conduit portion may have a connector for connection to a manual fluid injector, and the second conduit portion may have a hose with a fluid path in fluid communication with the fitting. The connector may have a fluid path and may be in fluid communication with the swivel and, through the swivel in fluid communication with the hose and fitting. The swivel may permit relative rotation between the connector and the hose about an axis normal to the fluid path of the hose and the fluid path of the connector.

The connector and the hose may be offset from one another such that a component connected to the connector can pass the hose when the connector and hose are rotated relative to one another.

The conduit may have a hose reel having a hose pick-up. The swivel may permit relative rotational movement between a conduit component in fluid communication with the hose reel and the hose reel, such that the hose pick-up may rotate to retract and dispense hose from the hose reel.

The conduit may have each swivel in the conduit non-manually releasably constrained from relative movement along the fluid path of the swivel.

Each swivel may be constrained by a respective connection that is made by compatible threads. Each connection may be manually releasable. Each swivel may be constrained by a permanent connection. Each swivel may be constrained by a connection that is constrained at all times during normal use of the swivel and any components thereof.

In a second aspect the invention provides a conduit adapter having a swivel, a first swivel fitting, and a second swivel fitting. The swivel provides fluid communication between the first swivel fitting and the second swivel fitting. The first swivel fitting is sized to connect to an external pressure side fitting of an air conditioning or refrigeration system. The second swivel fitting is sized to connect to a fitting that is itself sized to connect to an external pressure side fitting of an air conditioning or refrigeration system. The swivel permits rotational movement of the first swivel fitting relative to the second swivel fitting. The swivel is constrained to prevent linear movement between the first swivel fitting and the second swivel fitting.

The swivel may be constrained by a connection that is made by compatible threads. The connection may be manually releasable. The swivel may be constrained by a permanent connection. The swivel may be constrained by a connection that is constrained at all times during normal use of the swivel and any components thereof.

The first swivel fitting and the second swivel fitting may be sized for different air conditioning or refrigeration systems.

The first swivel fitting may have a first fluid path and the second swivel fitting may have a second fluid path. The first fluid path may be inline with the second fluid path.

The first swivel fitting has a first fluid path and the second swivel fitting has a second fluid path, and the first fluid path is normal to the second fluid path.

A third aspect the invention provides a charging manifold having a charging manifold body, high pressure side port, high pressure gauge, low pressure side port, low pressure gauge, charging port, and a plurality of swivels. A first swivel of the plurality of swivels permits relative rotation of the high pressure gauge and the charging manifold. A second swivel of the plurality of swivels permits relative rotation of the low pressure gauge and the charging manifold. The first and second swivels are constrained to prevent linear movement between the high pressure gauge and the charging manifold, and between the low pressure gauge and the charging manifold, respectively.

Each swivel may be constrained by a respective connection that is made by compatible threads. Each connection may be manually releasable. Each swivel may be constrained by a respective permanent connection. Each swivel may be constrained by a respective connection that is constrained at all times during normal use of the swivel and any components thereof.

In a fourth aspect the invention provides a charging manifold having a charging manifold body, high pressure side hose, low pressure side hose, charging hose, and a plurality of swivels. A first swivel of the plurality of swivels permits relative rotation of the high pressure side hose and the charging manifold body. A second swivel of the plurality of swivels permits relative rotation of the low pressure side hose and the charging manifold body. The first and second swivel are constrained to prevent linear movement between the high pressure side port and the charging manifold, and between the low pressure side port and the charging manifold, respectively.

The swivel may be constrained by a connection that is made by compatible threads. The connection may be manually releasable. The swivel may be constrained by a permanent connection. The swivel may be constrained by a connection that is constrained at all times during normal use of the swivel and any components thereof.

In a fifth aspect the invention also provides an injection hose assembly for connection between a pressurized system and an injector for injecting fluids into the pressurized system. The assembly has a first fitting compatible with a fitting on the pressurized system, and a second fitting compatible with the injector. The second fitting has an opening to which the injector can be connected. The assembly also has a substantially non-collapsible swivel joint between the first fitting and the second fitting, and a generally tubular hose between the first fitting and the swivel. The first fitting, hose, swivel and second fitting are connected to provide fluid connection between the first fitting and the second fitting. The second fitting is offset from the hose and the joint permits rotation of the second fitting with respect to the hose between a first and a second position. In the first position the second fitting opening is substantially aligned with the hose directed towards the first fitting. In the second position the second fitting opening is directed at 90 degrees to the hose.

The joint may also permit rotation of the second fitting to a third position again substantially at 90 degrees to the first position, while the second fitting opening is directed in the opposite direction from the second position.

The second fitting may be offset from the hose by a distance sufficient to permit the hose and the injector to pass one another without bending the hose.

Other aspects of the invention, including methods of utilizing conduits and swivels in accordance with the above aspects, will be evident based upon the principles described herein, including the FIGS. and other description provided.

BRIEF DESCRIPTION OF DRAWINGS

For a better understanding of the present invention and to show more were clearly how it may be carried into effect, reference will now be made, by way of example, to the accompanying drawings which show the preferred embodiment of the present invention and in which:

FIG. 24 is an exploded view of a preferred embodiment of a swivel for use in the hose assembly of FIGS. 20 through 23, FIG. 25 is a partially exploded view of the swivel of FIG. 24 from a position 90 degrees about the axis of the swivel, FIG. 26 is an end view of a plug used in the swivel of FIGS. 24 and 25, FIG. 27 is an end view of a portion of the swivel of FIGS. 24 and 25.

MODES FOR CARRYING OUT THE INVENTION

In this description connections may be referred to as permanent or non-manually releasable connections. A permanent or non-manually releasable connection is a connection that requires a tool, possibly utilizing some mechanical advantage, to make and to release the connection, if such release is possible. The connection may be made in many different ways, including by way of compatible male and female threads that are sufficiently tightly connected, for example, using a wrench or other such device, to prevent manual release. Other alternatives include glue or other sealants.

Figure 5:
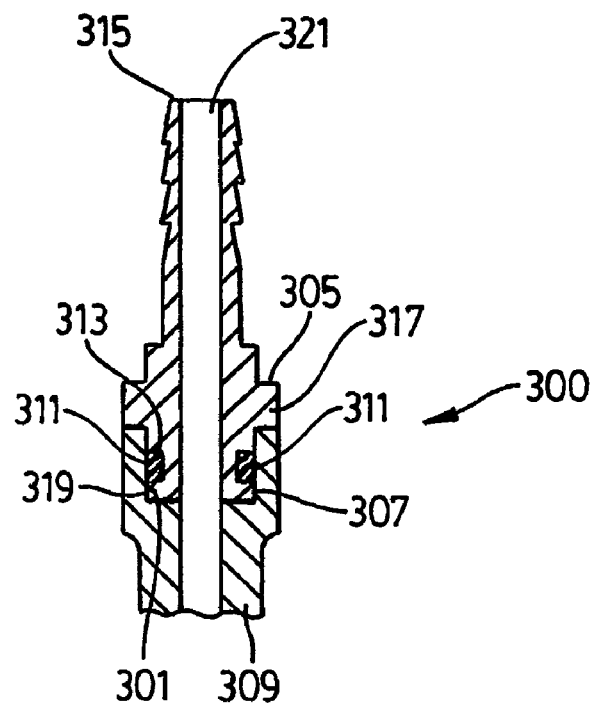
FIG. 5 is a cross-section of an example connection for use in a conduit in accordance with the preferred embodiment of the invention.

Referring to FIG. 5, a typical permanent connection 300 is made by way of compatible male threads 301 on a first fitting 305 and female threads 307 on a second fitting 309. The first fitting has an o-ring seal 311 in annular cavity 313 to provide a seal between the first and second fittings 305, 309. The first fitting 305 terminates in an elongate barb 315. A hose and crimp ring, not shown, are mounted on the barb 315, such that the crimp ring is crimped about the hose to retain the hose on the barb 315. Extending outwardly from the first fitting is a nut portion 317. The nut portion 317 permits the use of a wrench or other tool to provide a mechanical advantage for tightening the connection 300. The second fitting 309 has a grasping section 319 to permit the fitting 309 to be held manually or held by means of a tool during tightening of the connection 300. A chemical sealant could be used in the connection 300, preferably between the threads 301, 307. Such a sealant could also replace the o-ring seal 311. The connection 300 provides an axial fluid path 321 through the fittings 305, 309. The connection is generally symmetrical about the fluid path 321. The fitting 309 typically terminates in a hose barb and crimp, not shown, similar to the hose barb 315 and crimp of the fitting 305. The grasping section 319 may also be able to rotate about the fluid path independent of the hose of fitting 309 while the connection 300 is being made. This is typical, for example, in R12 manually releasable connections. Further alternatives might include a mechanical locking device, such as a spring clip and flange that prevents backing out of a connection. Many other forms of permanent connections will be evident to those skilled in the art taking into account the principles described herein. Permanent connections are typically preferable to manually releasable connections as permanent connections can be, for example, more secure, better sealed, less expensive, and smaller.

Manually releasable connections can also be made in different ways. For example, typical R12 air conditioning fitting used in HVAC applications utilize manually releasable threaded connections. In R134A automotive air conditioning systems, both manually releasable threaded fittings and quick disconnect ("snap-on") fittings are used to connect to the air conditioning system. A manually releasable connection could possibly utilize a manually accessible constraining device, such as a spring clip and flange; although, such a device would not be releasable in normal use of the swivel and its components. The device would be released rarely, if at all, for servicing or the like.

Figure 6:
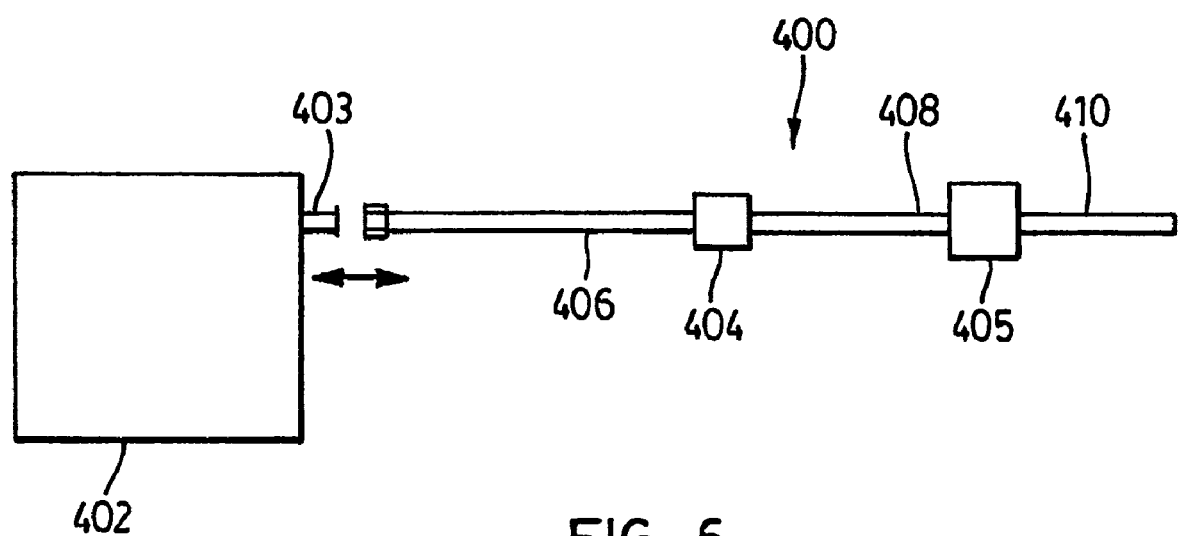
FIG. 6 is a diagrammatic view of a conduit for connection to an air conditioning or refrigeration system in accordance with the preferred embodiment of the invention.

Referring to FIG. 6, a sealed conduit 400 provides a sealed path for fluid connection to an air conditioning or refrigeration system 402 at a port 403. Within the conduit 400 are one or more conduit swivels, for example swivels 404, 405. The conduit 400 also has one or more conduit portions, for example portions 406, 408, 410. The portions 406, 408, 410 may include various components for fluid connection to air conditioning or refrigeration system 402, some of which will be described in detail herein. A conduit swivel 404 permits relative rotation of adjacent portions, for example portions 406, 408, of the conduit 400, while providing a sealed fluid path between the portions 406, 408 of the conduit 400. Similarly conduit swivel 405 permits relative rotation of adjacent portions, for example portions 408, 410, of the conduit 400, while providing a sealed fluid path between the portions 408, 410 of the conduit 400. The swivels 404, 405 are constrained to prevent relative linear movement between adjacent portions 408, 410 within the swivel 404, 405 along the fluid path A (the axis of the swivel 404, 405). This allows for easy alignment and realignment of the portions 406, 408, 410.

Swivels can be permanently (non-manually releasably) constrained, or manually releasably constrained. Examples of non-manually releasable swivels will be described later herein (for example, see FIGS. 7 and 24-27). Various manually releasable swivels are possible. An example of a manually releasable swivel is an R134A quick disconnect ("snap-on") connection formed from an R134A male fitting and R134A female fitting. In use, the male fitting and female fitting can swivel with respect to one another, inline with one another about the fluid path. Although manually releasable swivels may be convenient, non-manually releasable swivels are generally preferred. Non-manually releasable swivels can be designed to be more secure, better sealed, less expensive and smaller. However, it is possible that a swivel may be manually releasable. It is preferable that the swivel is constrained (not released for linear movement) during normal use of the swivel and its components. For example, the swivel of an R134A quick disconnect connection is manually releasable during normal use of the fittings that make up the connection. Examples of a release of a swivel that is not for normal use, would include, for example, servicing of the swivel or its internal components. Swivels that are designed to be constrained during normal use of the swivel and its components will typically be more secure and better sealed for a longer period of time.

Figure 7:
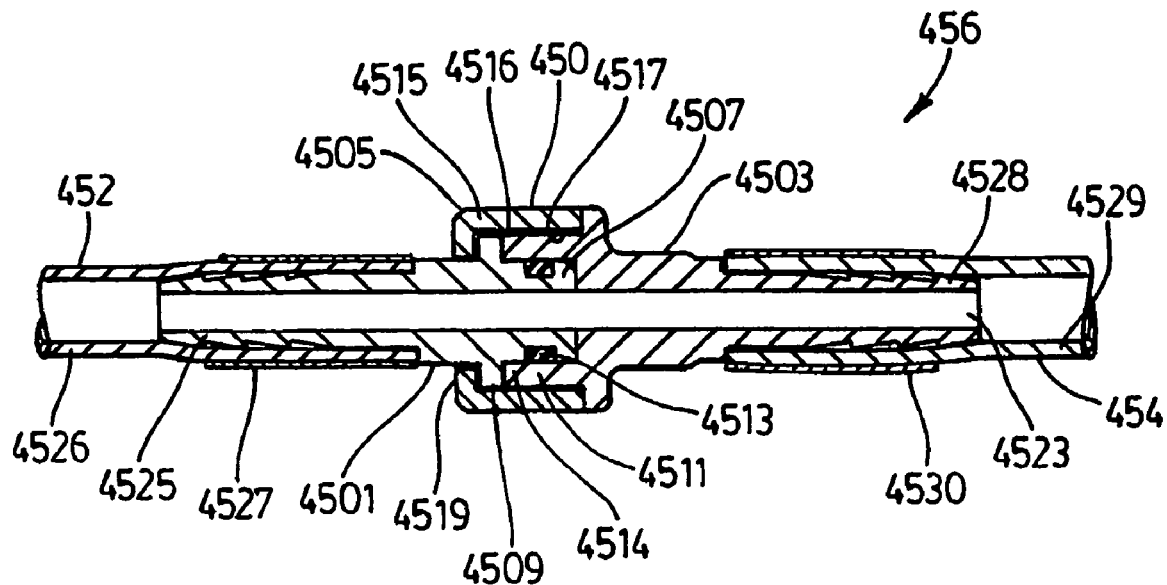
FIG. 7 is a cross-section of an example of an inline swivel for use in the conduit of FIG. 6.

There are two main types of swivels. Referring to FIG. 7, an inline swivel 450 falls between two adjacent portions 452, 454 of a conduit 456 that share the same fluid path axis immediately adjacent the swivel 450, and the swivel 450 permits relative rotation of the two portions 452, 454 about the fluid path axis. The swivel 450 has a first fitting 4501, a second fitting 4503 and a cover 4505. The first fitting 4501 has a first male swivel member 4507 and a flange 4509 extending outwardly beyond the swivel member 4507. The second fitting 4503 has a female swivel member 4511 for receiving the swivel member 4507. The first swivel member 4503 has an o-ring seal 4513 in an annular groove 4515 to provide a positive seal between the members 4507, 4511. The swivel members 4507, 4511 are fairly closely matched to prevent wear and loosening about the seal 4513. The second swivel member has an annual extension 4514 that abuts the flange 4509. The cover 4505 has a generally tubular body 4515 that extends over the flange 4509 and has compatible internal threads 4516 for external threads 4517 on the outside of the annular extension 4514. The cover 4505 also has a retaining ring 4519 that extends inwardly from the body 4514. The flange 4509 is constrained from linear movement away from the member 4511 by the retaining ring 4519. The members 4507, 4511 are thus constrained from linear movement away from one another. The flange is constrained from linear movement toward the member 4511 by the annual extension 4514. The members 4507, 4511 are thus constrained from linear movement toward one another. The portions 452, 454 are thus constrained from linear movement with respect to one another. Except at the seal 4513, the swivel members 4507, 4511 are generally smooth. The swivel members 4507, 4511 and are also generally symmetrical about the fluid path 4523. The swivel members 4507, 4511 are not restricted from rotation about the fluid path 4513, and are permitted to rotate about the fluid path 4513. The portions 452, 454 are thus permitted to rotate with respect to one another about the fluid path 4523. Many alternate means of constraining swivels could be provided, including without limitation those mentioned elsewhere herein. The fitting 450i terminates in a hose barb 4525 for connection to hose 4526 using crimp 4527 and the fitting 4503 similarly terminates in a hose barb 4528 for connection to hose 4529 using crimp 4530.

Figure 8:
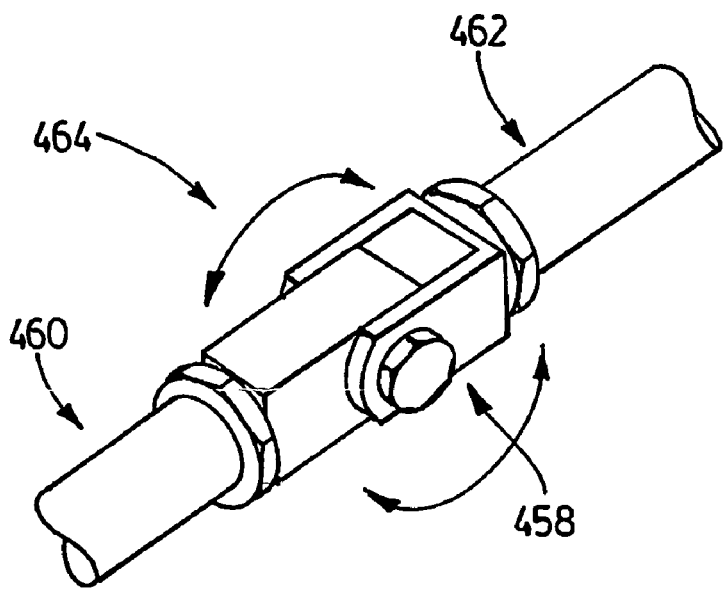
FIG. 8 is a perspective view of an example of a dual normal swivel for use in the conduit of FIG. 6.

Referring to FIG. 8, a normal swivel 458 falls between two adjacent portions 460, 462 of a conduit 464 where the swivel 458 permits relative rotation of at least one of the portions 460, 462 about an axis of the swivel 458 normal to the fluid path axis of that portion 460, 462.

Normal swivels and inline swivels can take different forms. For example, a dual normal swivel permits relative rotation of the two adjacent portions about the axis of the swivel.

A dual normal swivel 458 can be aligned so that the two adjacent portions are in the same plane and can rotate about the swivel through almost 360 degrees. An aligned dual normal swivel cannot swivel through 360 degrees as a sealed fluid conduit must be maintained through the swivel and, also, the two adjacent portions 460, 462 will meet one another if swiveled far enough.

Figure 9:
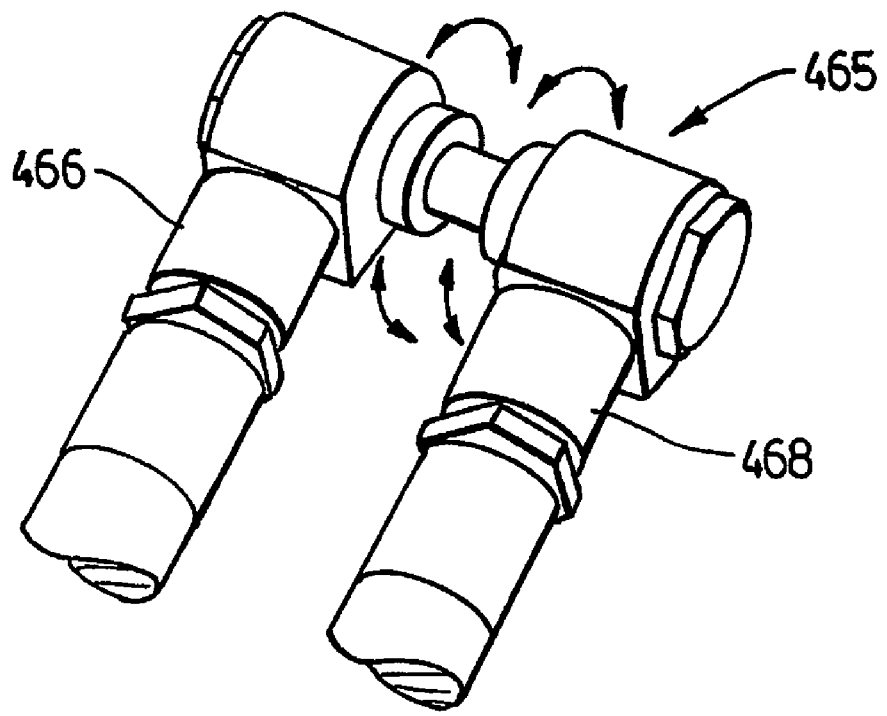
FIG. 9 is a perspective view of an example of an offset dual normal swivel for use in the conduit of FIG. 6.

Referring to FIG. 9, a dual normal swivel 465 can be offset so that the two adjacent portions 466, 468 are in non-intersecting parallel planes. This permits 360 degree rotation of the swivel 465.

Figure 10A:
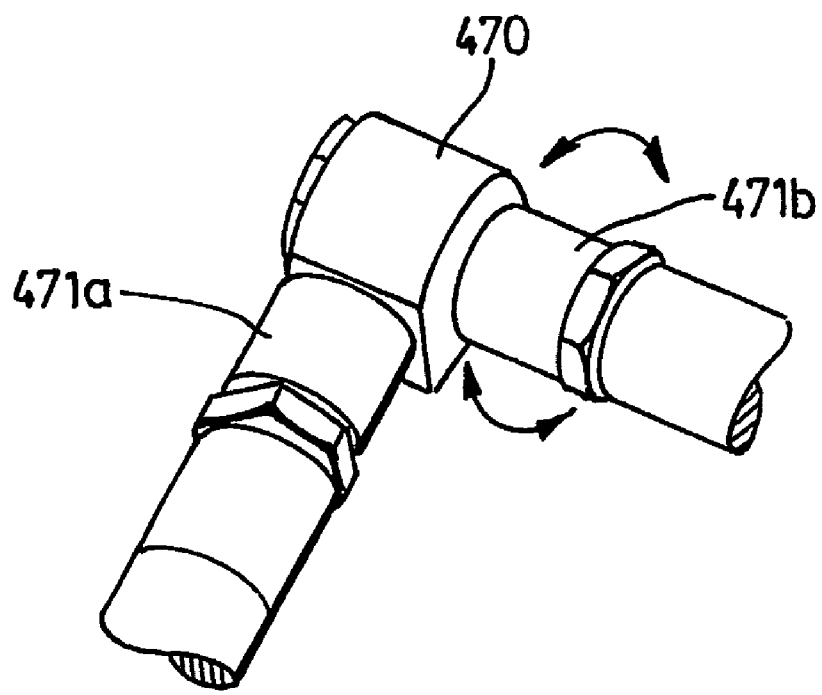
FIG. 10A is a perspective view of an inline, normal swivel for use in the conduit of FIG. 6.
Figure 10B:
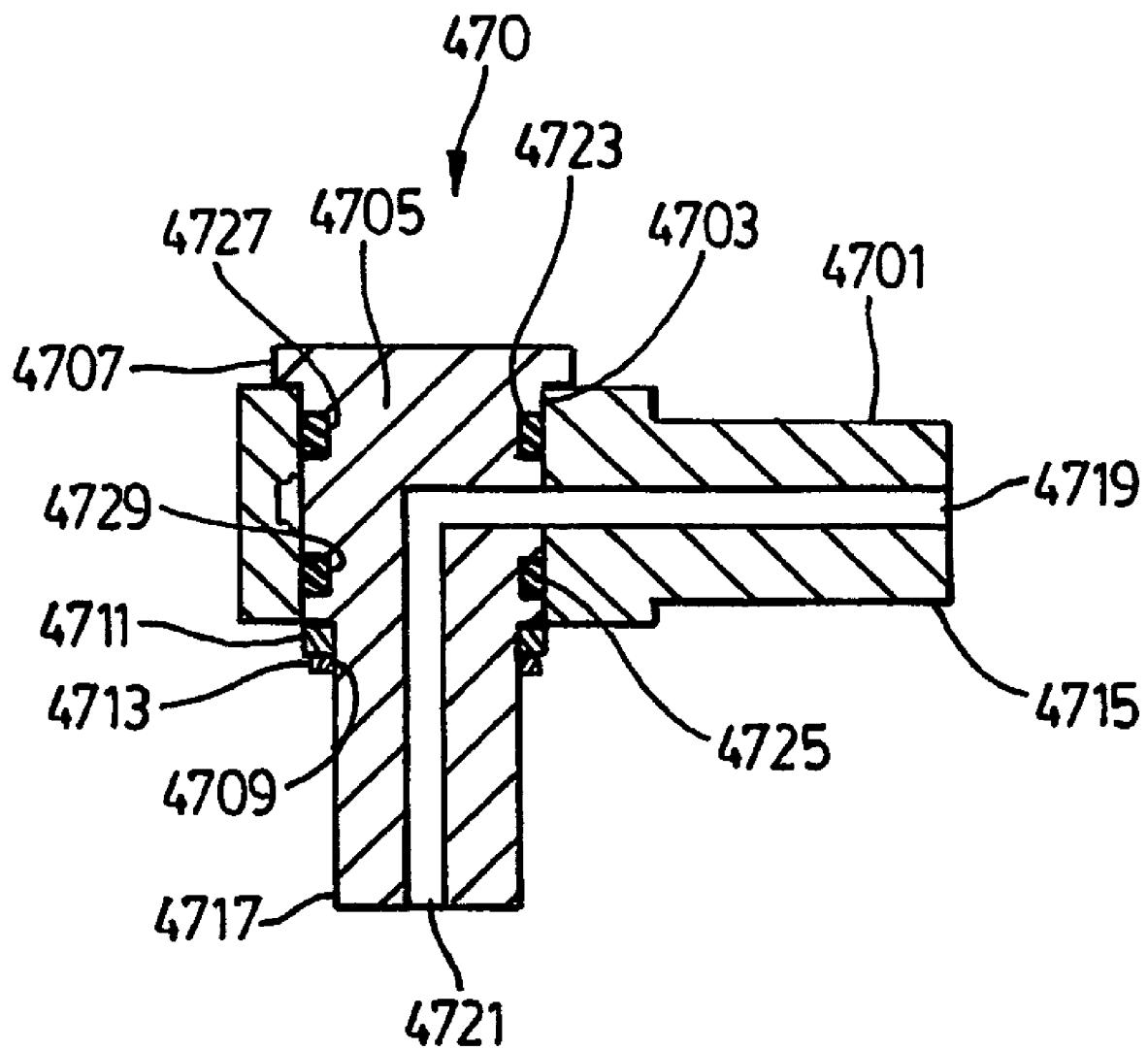
FIG. 10B is a cross-section of the swivel of FIG. 10A without hoses.

Referring to FIGS. 10A and 10B, a normal swivel and inline swivel can be combined as an inline, normal swivel 470; so that, rotation of one portion 471a is permitted about an axis of the swivel normal to the fluid path axis of that portion and rotation of the other portion 471b is permitted about the axis of the fluid path of that other portion. A combined inline, normal swivel 470 also provides a 90 degree change in orientation of the fluid path, a 90 degree elbow in effect.

The swivel 470 has a first fitting 4701 with a circular bore 4703 into which a generally tubular second fitting 4705 is inserted until head 4707 is reached. The second fitting 4705 has an annular groove 4709 spaced away from the first fitting sufficiently to allow a bushing 4711 to be retained by a spring clip 4713 placed in the groove 4709. The first and second fitting 4701, 4705 are constrained from linear movement with respect to one another by the above arrangement. The first fitting has a hose barb 4715 and the second fitting has a hose barb 4717. In the manner previously described, the hose barbs 4715, 4717 are for connection to hoses, not shown. The fitting 4701 has a fluid axis 4719 that is inline with the hose barb 4715. The fitting 4705 has a fluid axis 4721 that is inline with the hose barb 4717. The first fitting 4701 may be rotated such that the barb 4715 rotates normal to the fluid axis 4721, while the second fitting 4705 may be rotated such that the barb 4717 rotates about the fluid axis 4721. O-ring seals 4723, 4725 rest in annular grooves 4727, 4729 to provide positive seal between fitting 4701 and fitting 4705 about the fluid axes 4719, 4721.

Figure 11:
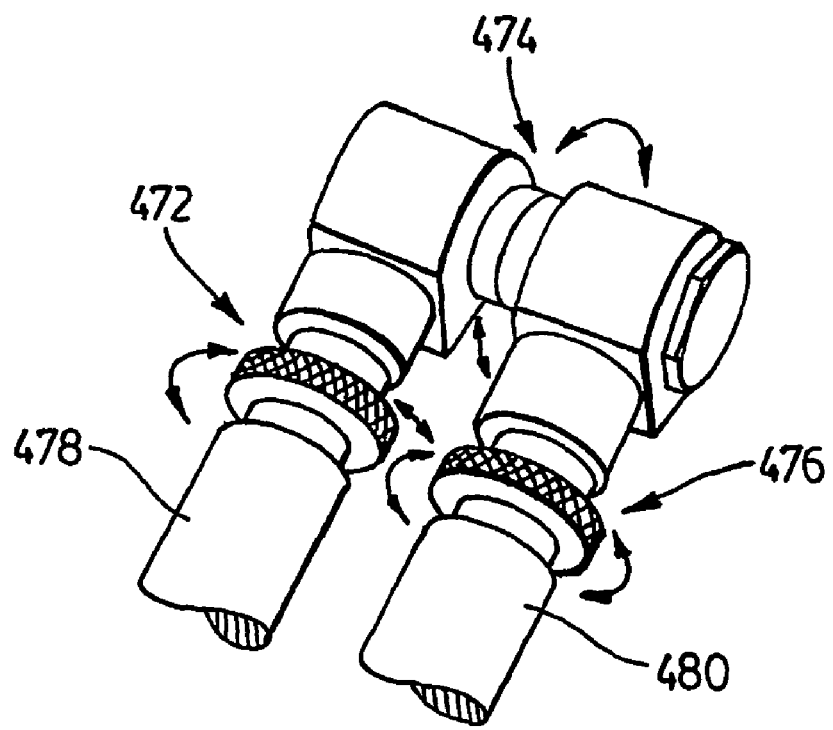
FIG. 11 is a perspective view of an example of an offset dual normal swivel for use in the conduit of FIG. 6.

Referring to FIG. 11, other combinations of normal and inline swivels may include, for example, an inline swivel 472, followed by a dual normal swivel 474, and an inline swivel 476. This allows rotation of either portion about its fluid axis and permits relative rotation of portions 478, 480 about the normal swivel axis. The dual normal swivel 474 can be aligned or offset.

Figure 12:
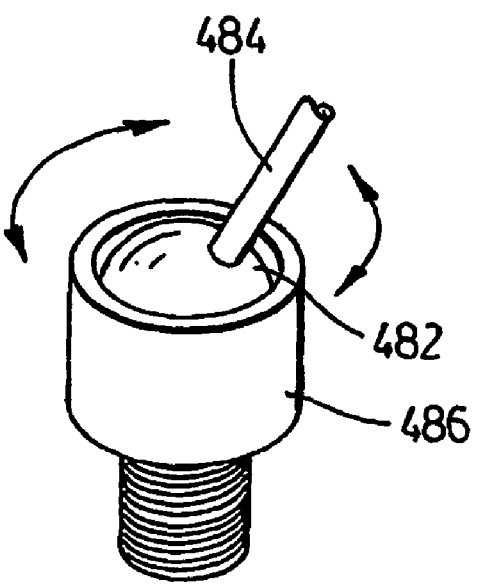
FIG. 12 is a perspective view of an example of a ball and socket swivel for use in the conduit of FIG. 6.

Referring to FIG. 12, a further example of a normal swivel in combination with an inline swivel is a ball and socket joint swivel 482. The ball and socket joint swivel 482 permits rotation of either portion 484, 486 about its fluid axis and permits relative rotation of the portions 484, 486 about an axis normal to both fluid axes. The ball and socket joint swivel 482 is a form of inline aligned dual normal swivel, and could be replaced by an inline swivel integrated, or discretely combined, with an aligned dual normal swivel to provide the same functionality.

Swivels can be combined from discrete components, for example, as shown by the inline swivel 472, dual normal swivel 474, inline swivel 476. Multiple swivels can be integrated, for example, as shown by the ball and socket joint swivel, and the normal/inline swivel.

Figure 13:
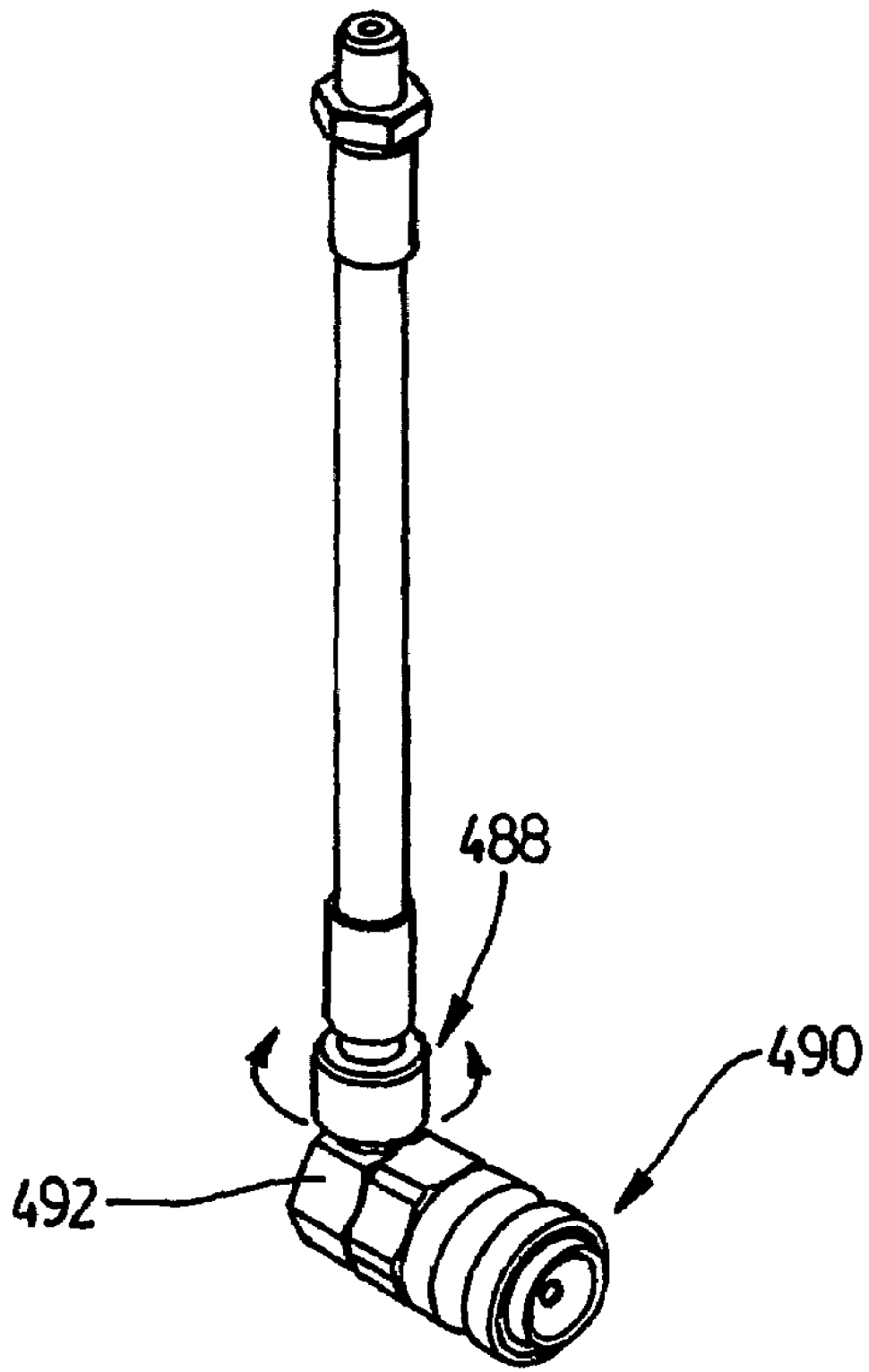
FIG. 13 is a perspective view of an example of an inline swivel with elbow for use in the conduit of FIG. 6.

Referring to FIG. 13, inline swivels 488 can be followed by portions 490 that have elbows 492 to permit rotational alignment about the axis of the swivel 488 of parts of the portion 490 whose fluid path is at an angle to the axis of the swivel 488. Such inline swivels 488 followed by elbow portions 490 can be part of other swivel combinations, such as the normal/inline swivel described previously. To allow easy passage of further portions extending from the elbow, the elbow can be offset from the inline swivel.

A normal offset swivel can be made from an elbow followed by an inline swivel and a second elbow.

Figure 14:
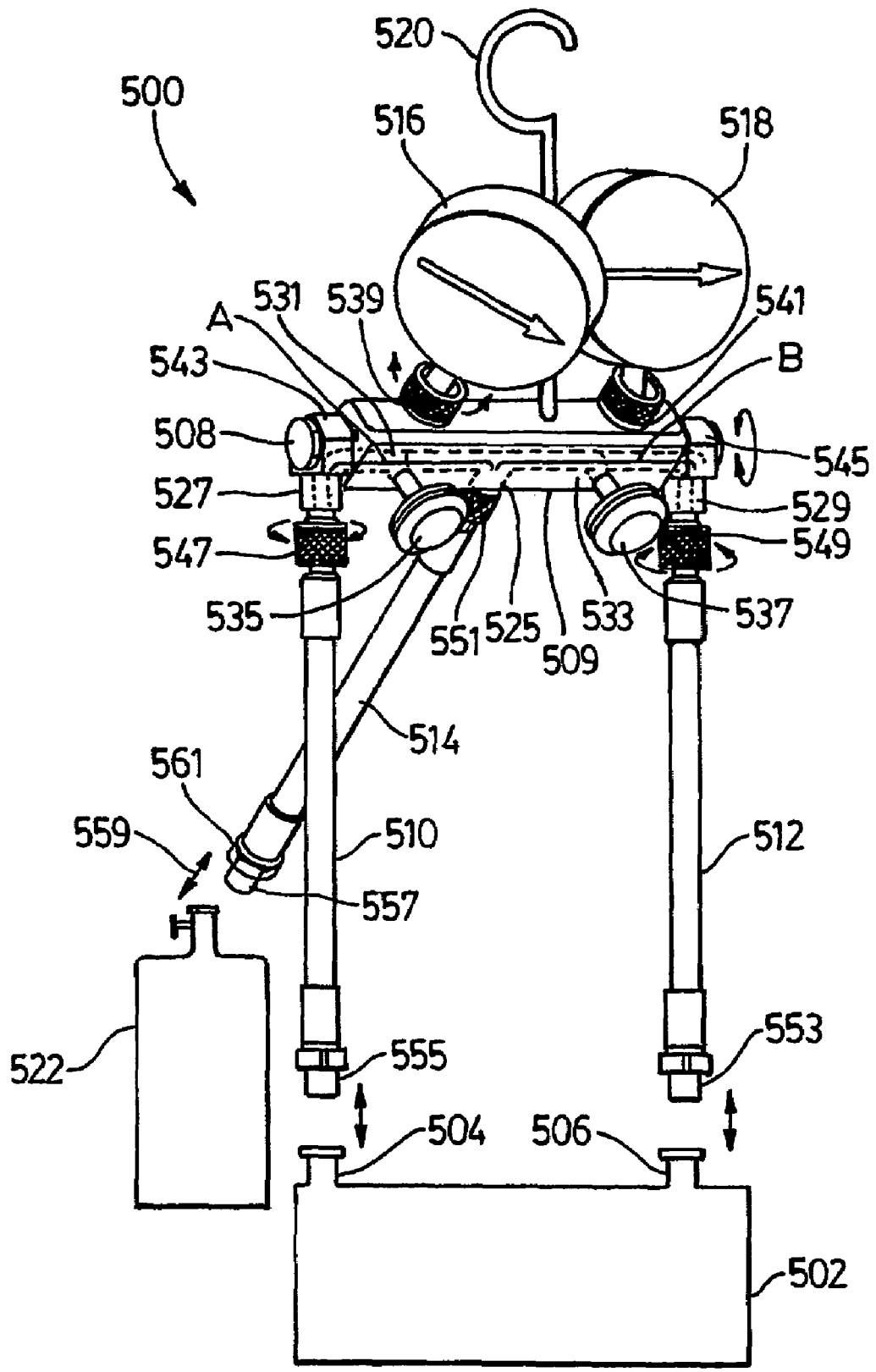
FIG. 14 is a perspective view of a conduit including a charging manifold with swivels in accordance with a preferred embodiment of the invention.

Referring to FIG. 14, a conduit 500 provides a sealed path for fluid connection to an air conditioning or refrigeration system 502. As shown in FIG. 14, the system 502 has a high pressure side port 504 and low pressure side port 506 providing access to the high pressure side and low pressure side, respectively, of the system 502. It is to be recognized that high pressure and low pressure in an air conditioning or refrigeration system 502 are relative terms. When in operation, low pressure is higher than ambient pressure surrounding the system 502, and high pressure is higher than low pressure.

Conduit 500 has a charging manifold 508 including a charging manifold body 509 high pressure side hose port 509a for connection to high pressure side hose 510, low pressure side hose port 509b for connection to high pressure side hose 512, charging hose port 509c for connection to charging hose 514, high pressure gauge 516, low pressure gauge 518, support 520 and charging station 522. The charging station 522 typically contains refrigerant for charging an air conditioning or refrigeration system and for conveying additives to an air conditioning or refrigeration system. For automotive air conditioning systems, the refrigerant is typically R12 or R134A; however, other refrigerants may be used for air conditioning or refrigeration systems, including for example $CO_2$. Additives may include for example lubricants and liquid dyes. The conduit 500 connects the charging station 522 and each of the other components of the conduit to the system 502. The high pressure side hose 510 of the manifold 508 is connected to the high pressure side port 508 of the system 502. Similarly, the low pressure side hose 512 is connected to the low pressure side port 510, and the charging hose 514 is connecting to the charging station 522.

Internally, the manifold 508 has a fluid path A from charging hose port 525 to high pressure side port 527 and a fluid path B from charging hose port 525 to low pressure side port 529. The fluid paths A, B are controlled by high pressure valve 531 and low pressure valve 533, respectively. The valves 531, 533 have respective knobs 535, 537 extending from the manifold 508 to allow manual actuation of the valves 531, 533. Fluid path A also opens to high pressure gauge port 539 between valve 531 and port 527. Fluid path B also opens to low pressure gauge port 541 between valve 533 and port 529.

The manifold 508 has a swivel 543 between the charging hose port 525 and the high pressure side port 527. The swivel 543 is an inline, normal swivel 543, normal to the high pressure side hose 510 and inline with the manifold body 509. The swivel 543 permits relative rotation of the high pressure side hose 510 about the manifold body 509. The manifold 508 has a second inline, normal swivel 545 between the charging port 525 and the low pressure side port 529. Again, the swivel 545 is an inline, normal swivel 545, normal to the low pressure side hose 512 and inline with the manifold body 509. The swivel 545 permits relative rotation of the low pressure side hose 512 about the manifold body 509. The two swivels 543, 545 allow rotation of the high pressure side hose 510 relative to the manifold body 509 and the low pressure side hose 512 relative to the manifold body 509, and independent of one another.

The manifold 508 has an inline swivel 547 between the swivel 543 and the high pressure side port 527. The inline swivel permits relative rotational movement of the high pressure hose 510 and the manifold 508 about the fluid path of the high pressure hose 510. Similarly, the manifold 508 has an inline swivel 549 between the swivel 545 and the low pressure side port 529. The inline swivel permits relative rotational movement of the low pressure hose 512 and the manifold 508 about the fluid path of the low pressure hose 512. Also, the manifold 508 has an inline swivel 551 between the manifold body 509 and the charging port 525. The inline swivel 551 permits relative rotational movement of the charging hose 514 and the manifold 508 about the fluid path of the charging hose 514.

The charging hose port 525, high pressure side port 527 and low pressure side port 529 are typically R12 threaded male fittings. This allows for connection of an R12 female fitting. The swivels 547, 549 and 551 can be provided with such female fittings for easy connections to a standard charging station. Many alternative forms of connections could be provided at the ports 525, 527, 529, some of which have been described elsewhere herein.

The configuration shown for the manifold 508 is an example only. Other swivels could be used. For example, there could be an inline, normal, inline swivel, not shown, in the middle of the manifold body 509 above the charging port 525. The swivel would be inline to either side of the manifold body 509 and normal to the charging hose 514. This would allow relative rotation of the charging side hose 514 about the manifold body 509.

The low pressure hose 512 and the high pressure hose 510 terminate in a threaded fitting 553, 555, such as for example R12 low side and high side fittings, respectively, for manual connection to the air conditioning or refrigeration system 502. The charging hose 514 terminates in a threaded fitting 557 for connection 559 to the charging station 522. In this case, the connection 559 is typically made by threaded the fitting 557 with male threads into compatible female threads, not shown, in the charging station 522

Inline swivels, such as swivel 488 of FIG. 13, can be provided in each of the hoses 510, 512, 514 adjacent the respective threaded fittings 553, 555, 557 to permit relative rotation of the fitting 553, 555, 557 and the hose 510, 512, 514 about the fluid path of the swivel 488.

The charging station 522 may equally be a vacuum pump, not shown, for evacuating the air conditioning or refrigeration system 502 into a reservoir, not shown. Alternatively, and as required in many jurisdictions, the charging station and vacuum pump may be part of a recycling and recovery machine, such as that described later herein with respect to FIGS. 31 and 32.

Figure 15A:
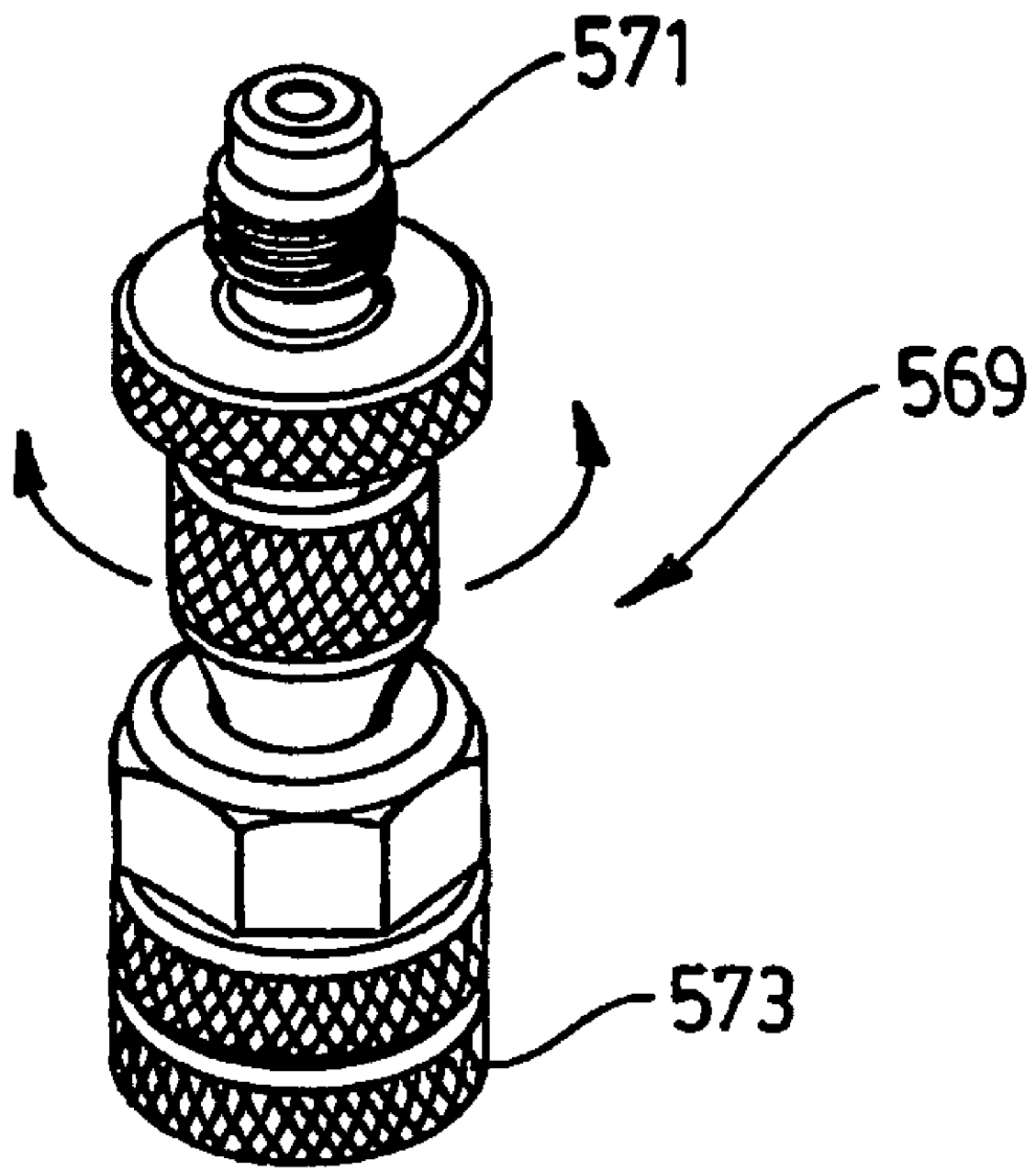
FIG. 15A is a perspective view of swivel adapter in accordance with a preferred embodiment of the present invention.
Figure 15B:
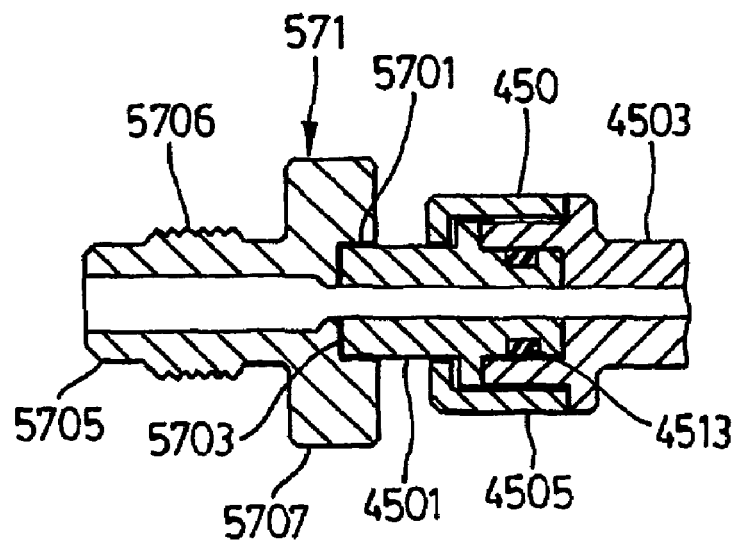
FIG. 15B is a partial cross-section of the swivel adapter of FIG. 15A.

Referring to FIGS. 15A and 15B, alternatively, an inline swivel adapter 569 can be attached to the fitting 553 or fitting 555 to provide an inline swivel. The inline swivel adapter 569 has a compatible fitting 571 to mate with the fitting 553 or 555, respectively, and a fitting 573 similar to the fitting 553 or 555, respectively. The similar fitting 553 or 555 allows for connection to the air conditioning or refrigeration system 502 at port 504 or 506, respectively, in the same manner as the fitting 553 or 555 would permit. The swivel adapter 569 permits relative rotation of the fitting 573 and the hose 510 or 512.

An inline swivel, such as swivel 488 of FIG. 13, and the inline swivel adapter 569 can be provided with the elbow 492 of FIG. 13 such that the fluid path entering the swivel 488 or 569 is normal to the fluid path exiting the swivel 488, 569, respectively.

The adapter 569 is similar to the connection 456 of FIG. 7 with fitting 571 in place of the barb 4525 and fitting 573, shown in FIG. 15A, in place of barb 4529. Accordingly, similar reference numerals will be used and the description for those reference numerals will not be repeated. The fitting 571 is fixed to the fitting 4501 in place of the barb 4525 using compatible threads on the fittings 4501 and 575 and a chemical sealant 5703. Other connection means, including a one-piece integrated fitting may be used. The fitting 4501 is shown with a male R12 termination 5705 having threads 5706. A knurled grasping section 5707 is provided to allow for easy grasping of the fitting 571 to permit rotation of the swivel 450.

Figure 16:
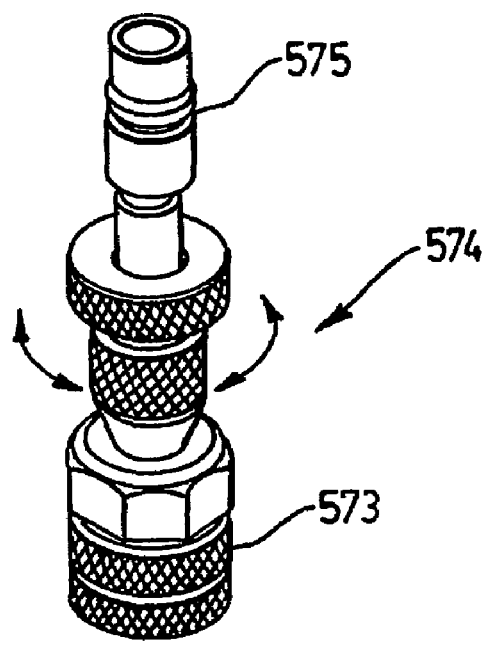
FIG. 16 is a perspective view of an alternate swivel adapter for use in accordance with a preferred embodiment of the present invention.

Referring to FIG. 16, in an inline adapter 574, fitting 575 may be chosen in place of the fitting 571, such that, the fitting 575 does not mate with the fitting 573. This provides a conversion from one type of fitting 563 or 565 to another 575. This allows the same hoses 510, 512 to be used for air conditioning or refrigeration systems 502 that utilize different fittings at ports 504, 506. As an example, when using many refrigerants, including R12, the air conditioning or refrigeration system 502 will have a fitting at ports 504, 506 with a specific screw thread for external connections. When using R134 refrigerant, a snap-on quick disconnect fitting is typically used at the ports 504, 506.

Referring again to FIG. 14, it is to be recognized that this description is being made with reference to an air conditioning or refrigeration system 502 that provides two ports 504, 506. Many systems only provide a single port, typically port 504. The principles described herein apply equally to the use of conduits for connection to systems 502 with a single port 504 or 506. The manifold 508 can be adapted to have a single pressure side port 527 or 529; however, typically one hose 510 or 512 will simply be unused for that particular application.

Between the high pressure gauge port 539 and the manifold body 509 is a swivel 581. Similarly, between the low pressure gauge port 541 and the manifold body 509 is a swivel 583. The gauges 516, 518 are connected to the swivels 581, 583, respectively. The swivels 581, 583 are ball and socket swivels 581, 583. The ball and socket joint swivel 581 permits relative rotation of the gauge 516 and the manifold 9 body about their respective fluid axes adjacent the swivel 581 and permits relative rotation of the gauge 516 and the manifold body 509 about an axis normal to the fluid paths of the gauge 516 and manifold body 509 adjacent the swivel 581. Similarly, the ball and socket joint swivel 583 permits relative rotation of the gauge 518 and the manifold 9 body about their respective fluid axes adjacent the swivel 583 and permits relative rotation of the gauge 518 and the manifold body 509 about an axis normal to the fluid paths of the gauge 518 and manifold body 509 adjacent the swivel 583.

The ball and socket joint swivels 581, 583 permits easy adjustment of the gauges 516, 518 relative to the manifold body to allow the operator to view the gauges 516, 518 when in use. This is very helpful to the operator as the relative position of the manifold 508, hoses 510, 512, 514, support 520 and air conditioning or refrigeration system 502 will result in different initial locations of the gauges 516, 518. The operator can simply realign the gauges 516, 518 as desired. High pressure gauge port 539 and low pressure gauge port 541 could be provided with R12 threaded male fittings and receive R12 threaded female fittings from the swivels 581, 583, permanent connections could be made, or other connections could be made as desired by the designer of the manifold.

Figure 17:
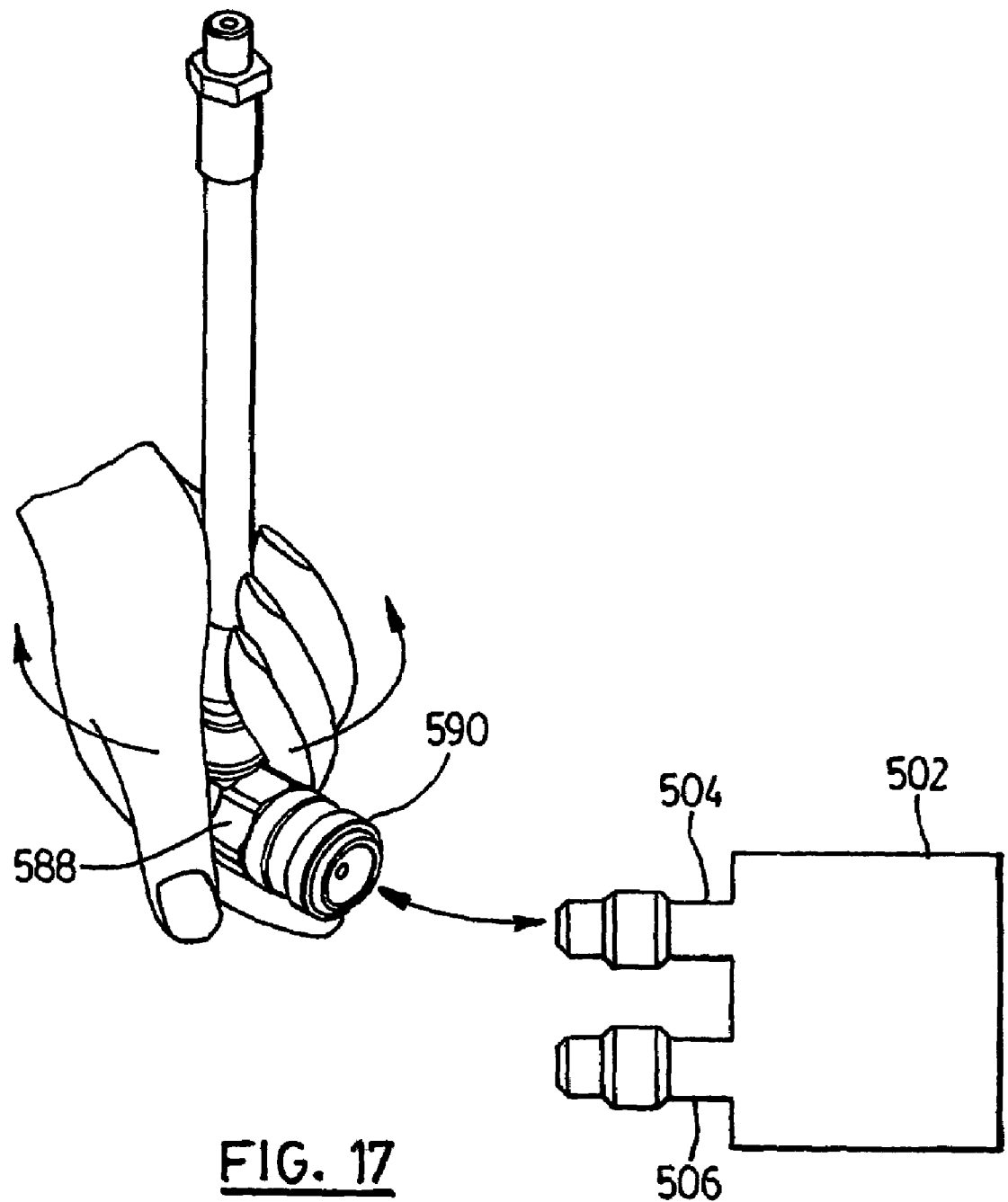
FIG. 17 is a partial perspective exploded view of conduit portions with an inline swivel and elbow in accordance with the preferred embodiment of the invention.

In use, the conduit 500 is connected at the fittings 553, 555 or 573 to the air conditioning system 502 at ports 504, 506. This may be done before or after attaching the manifold 508 by the support 520 to a suitable attachment location, for example the underside of an automobile hood. The operator may align or realign various components of the conduit 500 before, during or after connection of the conduit 500 to the air conditioning or refrigeration system 502. Referring to FIG. 17, this includes, for example, swiveling of an inline swivel with elbow 588 to align fitting 590 with an external fitting on an air conditioning or refrigeration system, such as port 504, 506 of FIG. 14.

Figure 18:
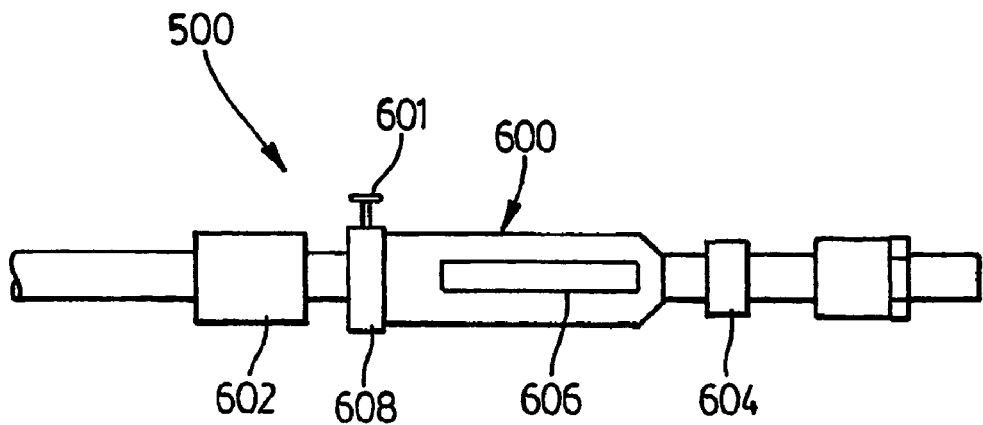
FIG. 18 is a side view of conduit portions with swivels and an inline injector.

Referring to FIG. 18, the conduit 500 may include other components that may or may not have adjacent swivels. For example, the conduit may have one or more inline swivels 602, 604 adjacent an inline injector 600. Many inline injectors 600 will not benefit from a swivel 602, 604 as the orientation of the injector 600 is not critical to its operation; however, a pair of swivels 602, 604 can be advantageous in some circumstances, for example, when the injector 600 has a window 606 for viewing the contents of the injector 600. The swivels 602, 604 can allow rotation of the injector 600 about the fluid path in order to orient the 606 for easy viewing by the operator when in use. If the injector 600 has a shut-off valve 601 then a single swivel 602 may allow unthreading and re-threading of an inline cap 608 of the injector 600 to allow for refilling of the injector 600. An example of an inline end fill injector 600 is described in previously referenced U.S. Pat. No. 5,673,722 of Jack Brass.

Figure 19:
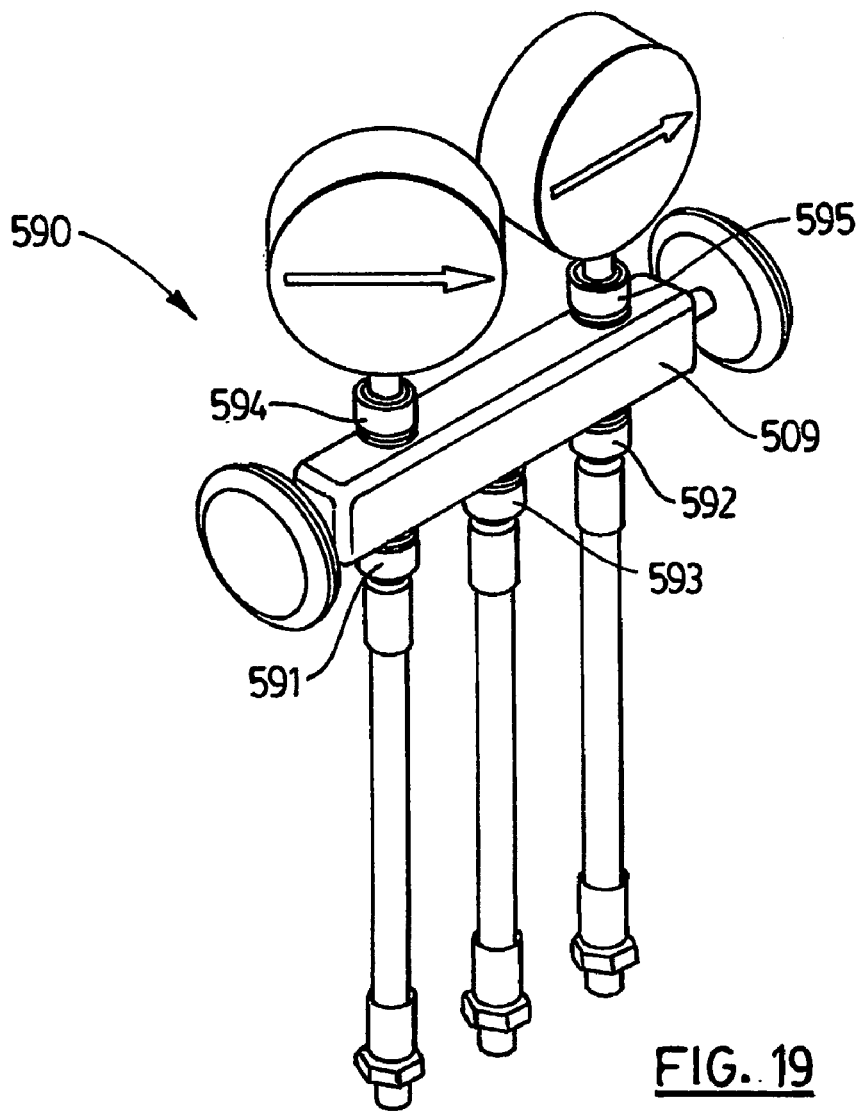
FIG. 19 is a perspective view of an conduit with charging manifold and swivels in accordance with an embodiment of the present invention.

Referring to FIG. 19, an alternative charging manifold 590 utilizes inline swivels 591-595 in place of swivels 545, 547, 551, 581, 583, respectively. This permits rotation of the manifold body 509 and the conduit portion to which the respective swivel 591, 592, 593, 594 or 595 is attached. The swivels 591-593 can be easily adapted to existing manifold bodies without modification. An alternative swivel in place of swivel 591-593 that could be used to avoid modification to existing manifold bodies, while providing equivalent functionality to manifold 508 is an inline aligned normal swivel that permits rotation about the fluid path while allowing rotation normal to the path.

Referring to FIGS. 20 through 30, a conduit 700 utilizing a hose assembly with swivels, such as hose assembly 20, provides a more versatile method of using an injection system (an injector 11 together with a hose assembly 20) in that it allows for easier access to connect to an air conditioning or refrigeration system 502 as well as being more compact to store in a carrying case or tool box, not shown. As alluded to previously, today's automotive engine compartments, and other environments in which air conditioning or refrigeration systems may be found, leave very little access space for repairs. Attaching an injector hose assembly 20 to the low side service port, such as port 506 of FIG. 14 (the port typically used for external connection in automotive applications) of an automotive air conditioning system can be cumbersome and inconvenient. After the connection is made the position of the injector 11 may not be conducive to being comfortable and to perform accurately the injection process. A swivel feature provides a sound ergonomic solution to this process. Additionally a feature of being able to fold the hose assembly 20 to being parallel (aligned side by side) with the injector 11 allows for easier storage in a tool box or drawer.

Figure 1:
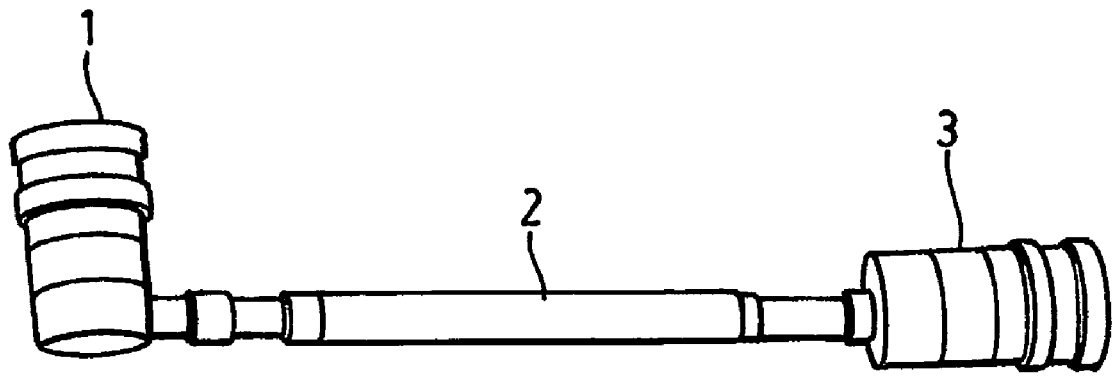
FIG. 1 is a perspective view of a hose assembly for use with an R134A refrigeration system.
Figure 2:
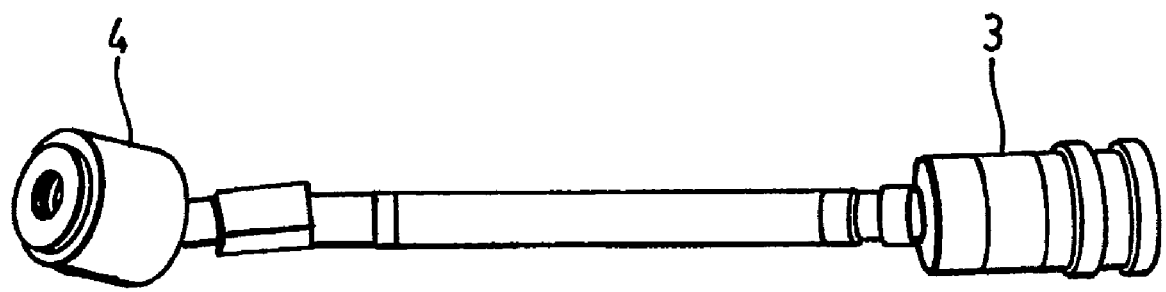
FIG. 2 is a perspective view of a hose assembly for use with an R12/R22 refrigeration system.
Figure 3:
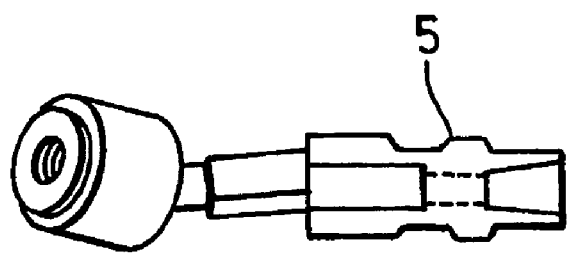
FIG. 3 is a perspective view of an adapter for converting the hose assembly of FIG. 1 for use with an R12/R22 refrigeration system.
Figure 4:
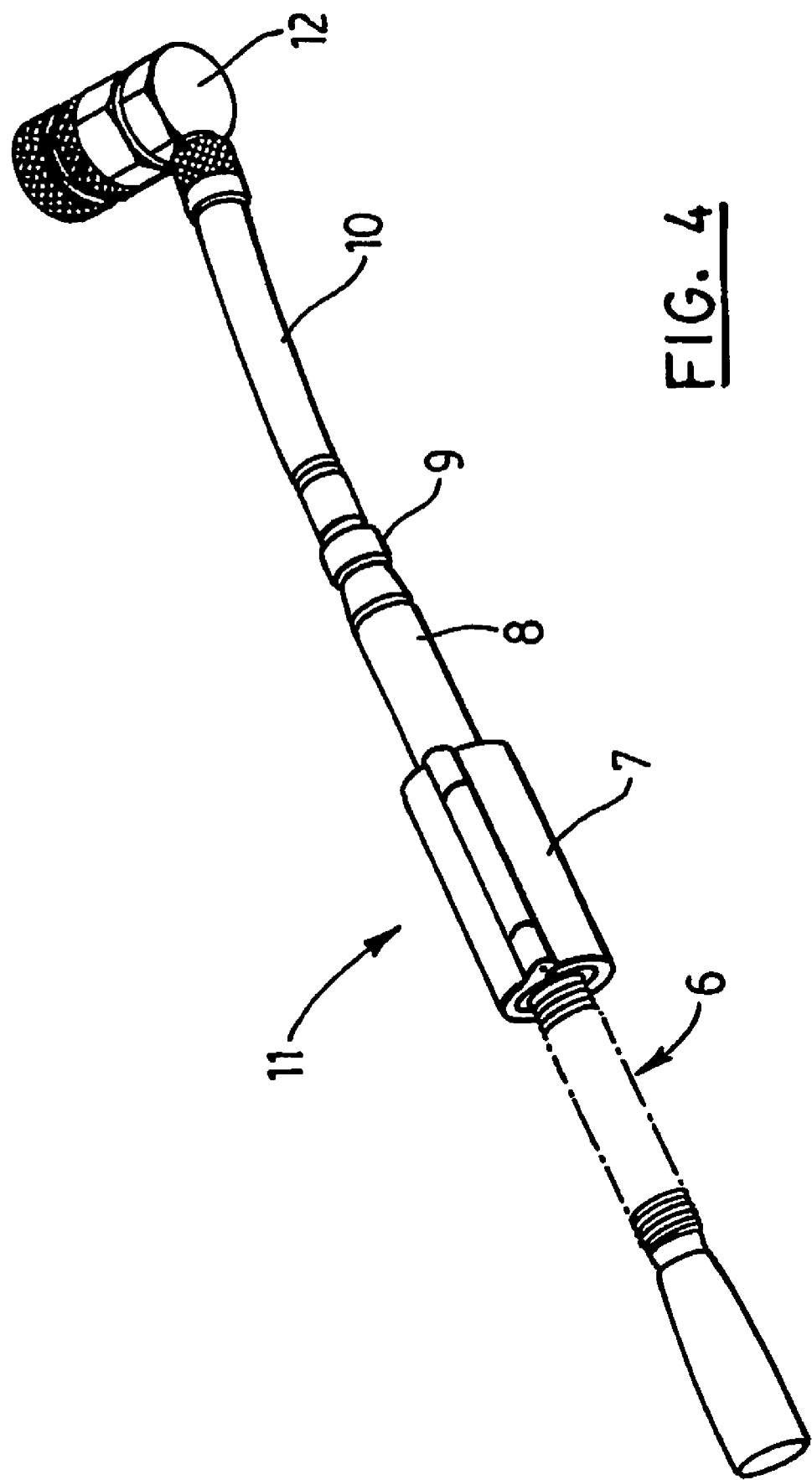
FIG. 4 is a perspective view of a hose assembly of FIG. 1 used in association with a cartridge and manual injector.
Figure 20:
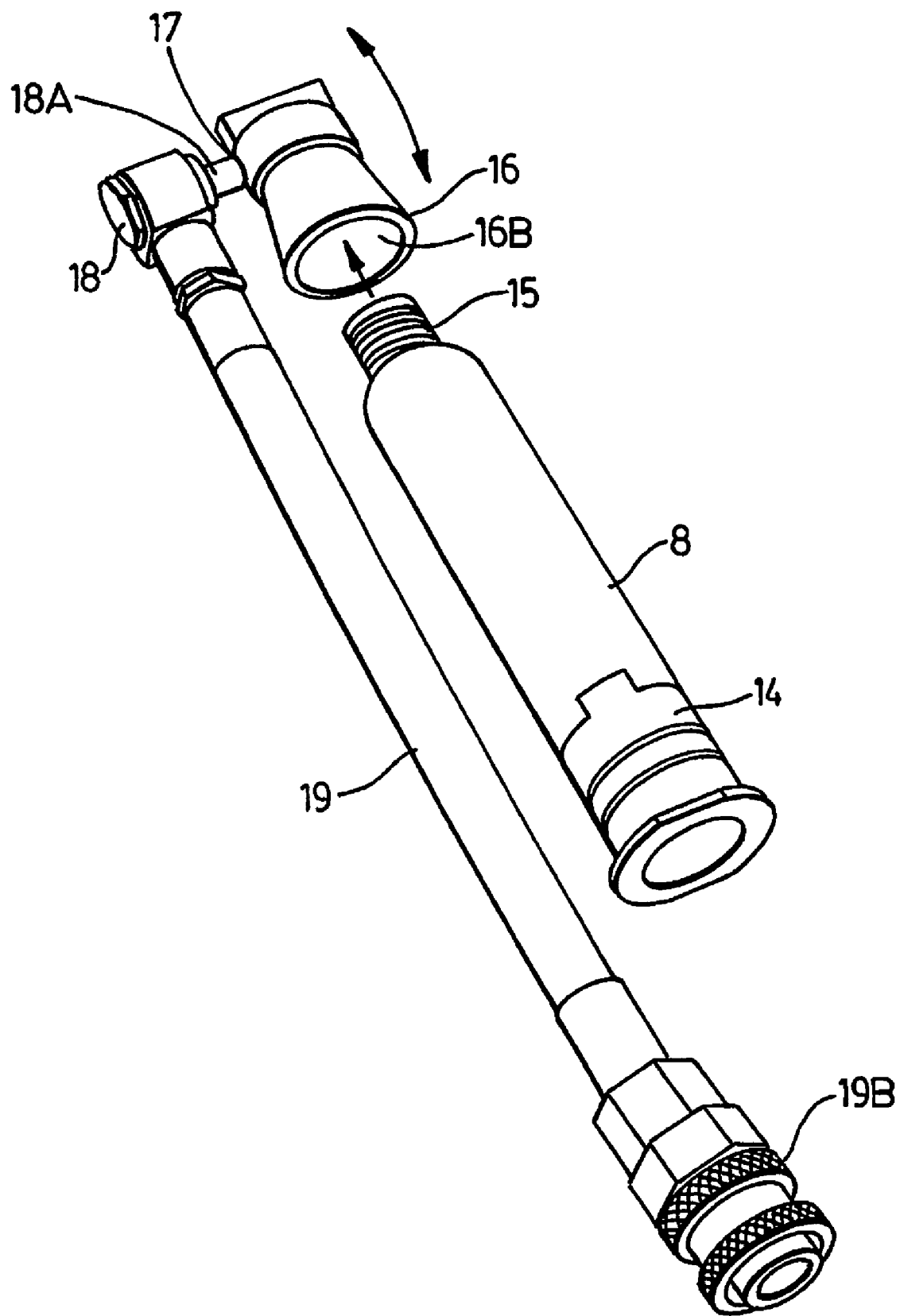
FIG. 20 is a disassembled perspective view of a hose assembly with swivel in accordance with the preferred embodiment of the invention and a cartridge for holding liquid to be injected.

Referring to FIG. 20, conduit 700 has manual injector 11 (see FIG. 4, cartridge 8 of which is shown in FIG. 20) and hose assembly 20 for connection to an air conditioning and refrigeration system, such as system 502 of FIG. 14. Cartridge 8 (in this case an empty cartridge 8) is similar to that in FIG. 4 and has a piston 14. Male threads 15 on the cartridge 8 provide a connector 15. The hose assembly 20 has a joint (swivel body 16 and swivel arm 18). Swivel body 16 has a threaded opening 16a that mates with connector 15. The swivel body 16 with opening 16B provides a fitting for connection to injector 11. The swivel body 16 is connected to swivel arm 18 to provide a swivel point 17. Flexible hose 19 connects the swivel arm 18 to a fitting 19B for connection to an air conditioning or refrigeration system 502. The swivel arm 18 provides an offset between the hose 19 and the injector 11 to allow the injector 11 and hose 19 to pass one another without having to bend the hose 19.

In most cases, the connection to the air conditioning or refrigeration system 502 is preferably made at the low) side of the system 502; however, some air conditioning or refrigeration systems 502 only provide a high side port 504. As is known to those skilled in the art, the hose assembly 20 should be designed to withstand pressures that may be encountered when in use.

The swivel body 16 and swivel arm 18 provide an elbow (swivel body 16) and inline, normal swivel 702 (swivel body 16 and swivel arm 18) to permit inline rotation of the swivel arm 18 about its fluid path adjacent the swivel 702 and rotation of the swivel body 16 about the fluid path of the swivel arm 18 normal to the fluid path of the swivel body 16.

Alternatively, in conduit 703 a normal, inline swivel 704 could be provided at an end of hose 706 followed by an elbow 708. In this case opening 16B is fixed to swivel arm 710 and swivel body 712 is fixed to hose 706. Conduit 703 is equivalent to conduit 700 in that the swivels 702, 704 and elbows 700, 18 permit offset normal rotation of the opening 16B and the hose 19, 706 about an axis normal to their respective fluid paths, such that the opening 16B can pass the hose 19, 706.

As alluded to previously and as demonstrated again above, it is to be understood that swivels and swivel combinations can be made up of different configurations to provide similar functionality. Each of these different configurations falls within the spirit and scope of the invention as claimed, including equivalents of such functionality.

Figure 21:
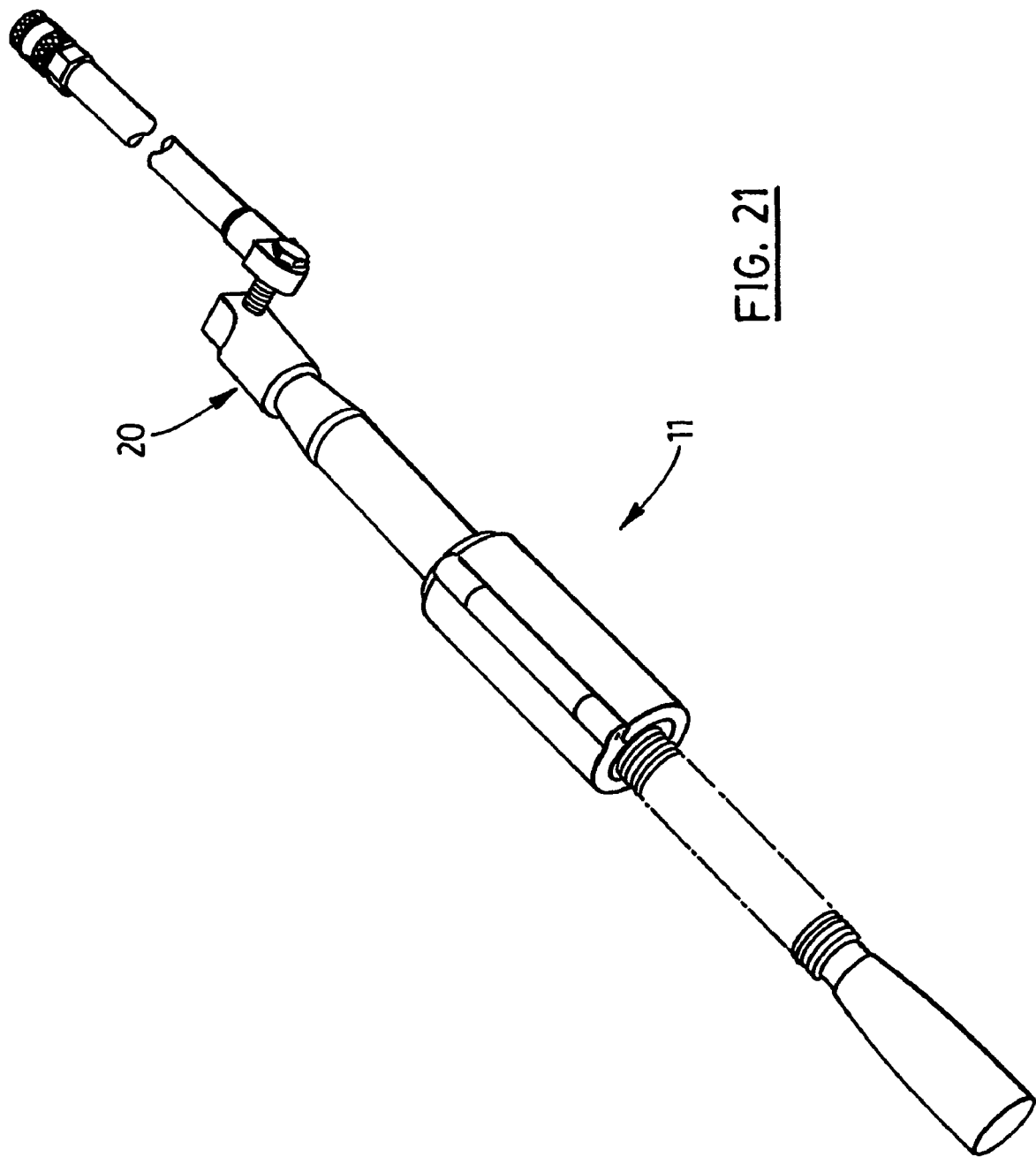
FIG. 21 is an assembled perspective view of the hose assembly and cartridge of FIG. 20 and a manual liquid injector, with the hose in a first position.

Referring to FIG. 21, hose assembly 20 (the same assembly as shown in FIG. 5) is connected to injector 11 in a fully extended position with the hose 19 and opening 16B aligned with one another, but with the opening 16B directed away from the second fitting 19B. The total length of the injector 11 and hose assembly 20 is similar to that shown for the injector 11 and hose assembly 9, 10, 12 of FIG. 4.

Figure 22:
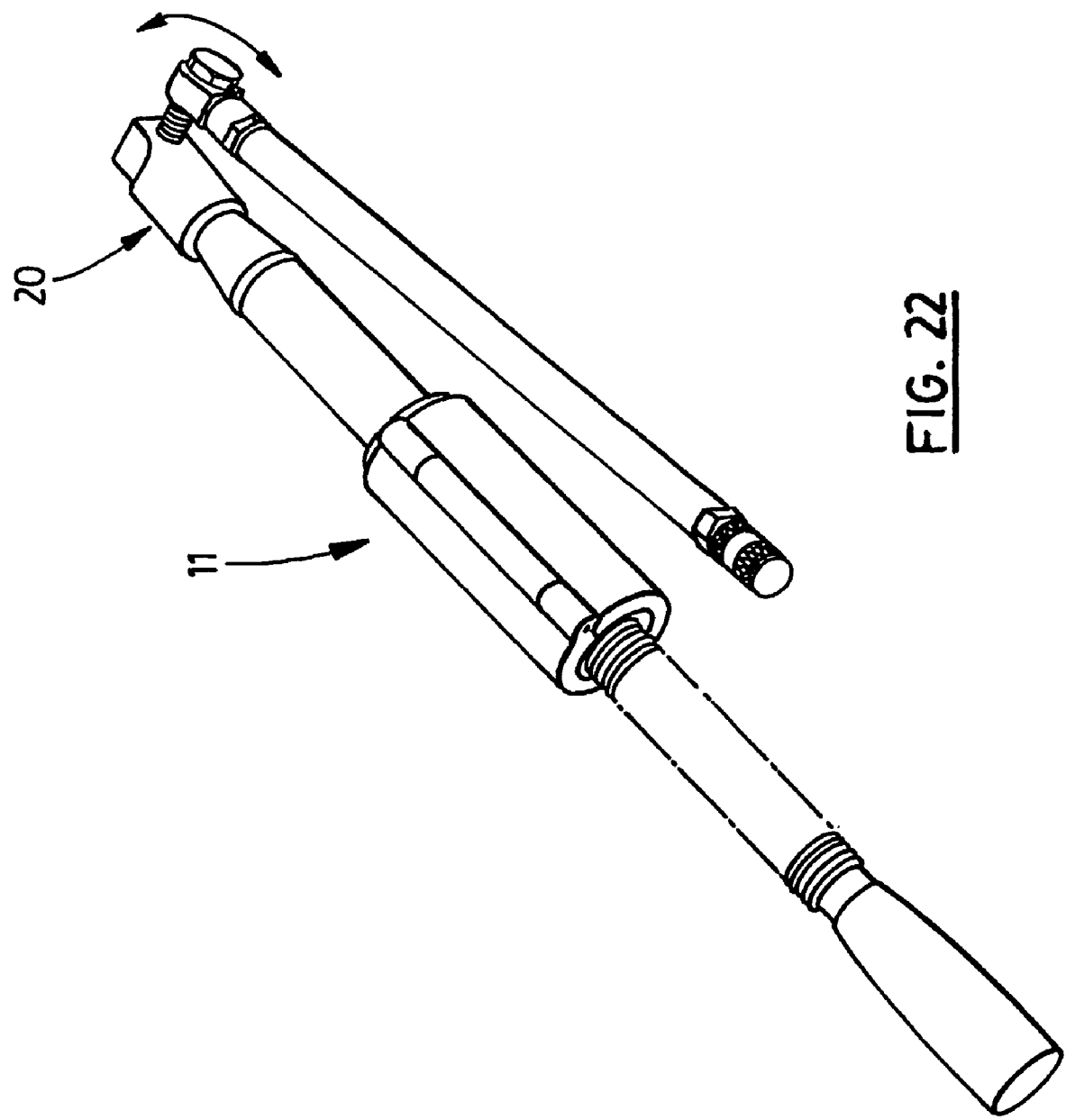
FIG. 22 is a perspective view of the hose assembly, cartridge and injector of FIG. 21, with the hose in a second position.

Referring to FIG. 22, hose assembly 20 is folded in parallel (aligned side by side) with the injector 11. The overall length is considerably shorter than that of FIGS. 4 and 21. This is very useful for storage of the injector 11 when connected to the hose assembly 20. Typically the injector 11 and hose assembly 20 are stored connected to each other as it is easy to get the liquids on clothing and other objects when the injector 11 and hose assembly 20 are disconnected. These liquids are often very difficult remove. Clothing can be easily ruined from contact with these liquids.

Figure 23:
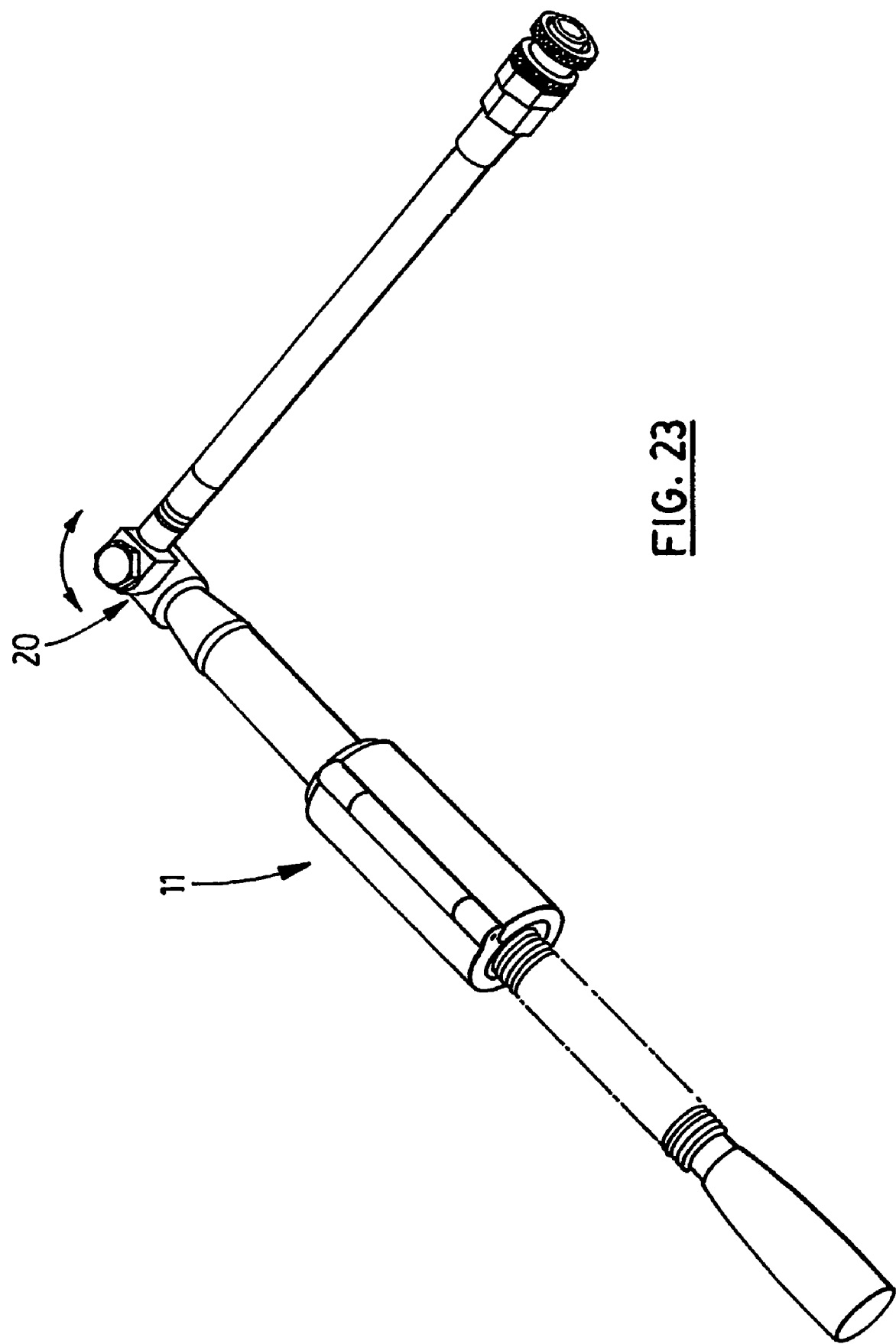
FIG. 23 is a perspective view of the hose assembly, cartridge and injector of FIG. 22, with the hose in a third position.

Referring to FIG. 23, hose assembly 20 has a position at approximately 90 degrees to injector body 7. The hose assembly 20 will typically be used substantially in this position for air conditioning systems 502 as it permits connection to an air conditioning port 504, 506 that is pointing upwards, while holding an injector 11 horizontally. This is generally a preferred position.

Although the parallel (side by side) position and the 90 degree position are necessary to avoid having to bend the hose 19 in many applications (something that is not easy when also having to connect the hose assembly 20 to the injector 11 and air conditioning or refrigeration system 502), other positions are helpful. For example, being able to put the hose assembly 20 into a position opposite to that shown in FIG. 23, such that the opening 16B is directed at 90 degrees to the hose 19, but the opening 16B is at 180 degrees to the position shown in FIG. 8, allows the injector 11 to be flipped, while otherwise maintaining the hose assembly 20 in position. This means that an operator has much more flexibility in choosing the most comfortable or otherwise preferable position for holding the injector while connected to the air conditioning or refrigeration system.

Referring to FIGS. 24 through 27, the internal design of swivel 702 is evident. It is not necessary to use this particular design in order to achieve all or any one particular benefit described herein. It will be evident to those skilled in the art that modifications can be made to what has been described throughout this description while remaining within the spirit and scope of the invention as described by the claims.

Swivel arm 18 is shown shortened in FIG. 24. The arm 18 can be easily extended as shown in FIGS. 5 through 8, for example, by providing an extension 18A in FIG. 20. Arm 18 has a coupling protrusion 91 having a first annular groove 93 followed by a second annular groove 95 of greater diameter. The swivel body 16 has an aperture 97 of similar general contour to, and for receiving, the protrusion 91.

The aperture 97 has an annular groove 99 for receiving an elastic retaining ring, not shown, that is placed in the groove 95 under compression, and permitted to expand into the groove 99, such that the ring extends into both grooves 99 and 95. This serves to lock the swivel arm 18 and swivel body 16 together, while allowing rotational movement. Other means of locking the arm 18 and body 16 could be used, such as a set screw, not shown, through the body 16 into the groove 95. An o-ring, not shown, is placed in the groove 93 for sealing against wall 101 of aperture 97 to prevent leakage between the aperture 97 and protrusion 91.

There is a bore 103 through the swivel body 16 into opening 16. The bore 103 has a narrow portion 105 into which the aperture opens. The narrow portion 102 receives a plunger 107 with a broad head 109 and a narrower body 111. The head 109 and bore 103 have matching contours to provide a seal that blocks access between the bore 103 and the opening 16. An o-ring, not shown, can be provided to seat between the bore 103 and head 109 for a better seal.

The head 109 is normally biased against the bore 103 by a compression spring, not shown, held in place between plug 112 and head 109 about the plunger body 111. The plunger 107 can be pushed away from the bore 103 against the compression spring to provide access between the bore 103 and the opening 16B. In this way the plunger 107/bore 103 combination acts as a check valve. The check valve is located in close proximity to the opening 16B to minimize spillage when an injector assembly is removed from the opening 16B.

Swivel arm 18 has a mouth 113 with threads 115 for receiving a threaded hose, such as hose 19. A tubular tunnel 117 extends from the mouth 113 through the protrusion 91.

When the swivel arm 18 and body 16 are locked together and the check valve is open, liquid access is provided from the opening 16B about the plunger 107 through the bore 103, aperture 97 and tubular tunnel 117 to the mouth 113 and a connected hose, such as hose 19. The check valve can be opened by injected liquid from an injector assembly into the opening 16B.

Thus, the joint (swivel arm 18 and body 16) together with a hose 19 and fitting 19B provide a liquid path between, for example, an injector assembly 12 and an air conditioning or refrigeration system 502 connected to fitting 19B.

The swivel arm 18 and body 16 are preferably made from brass; however, other materials, including metals such as aluminum or steel and including plastics, may be used separately or in combination provided the materials are selected for compatibility and strength.

The swivel arm 18 and swivel body 16 provide a non-collapsing joint with multiple positions. In this context non-collapsing means that the path does not collapse to impede or prevent the flow of liquid as a result of moving the joint between positions. A collapsing joint would, for example, be a joint formed from a flexible hose or rigid tube that crimps when sufficiently bent, resulting in restricted or blocked flow.

Figure 28:
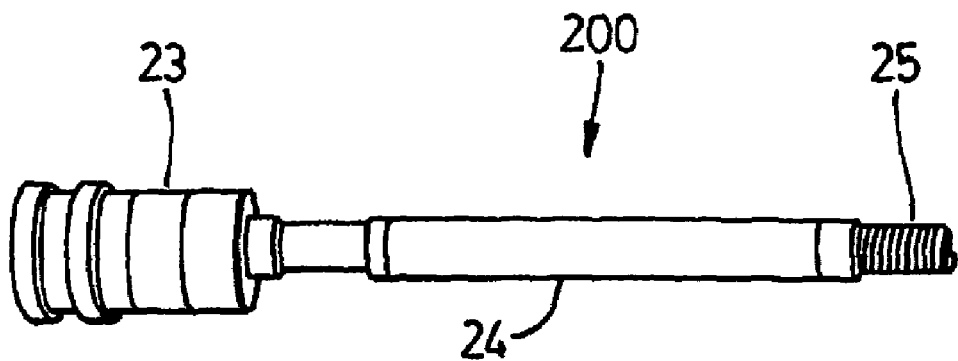
FIG. 28 is a perspective view of a straight R134A hose subassembly of the hose assembly of FIGS. 20 through 23 for use with the swivel of FIGS. 24 and 25.

Referring to FIG. 28, a hose assembly portion 200 for connection to a joint as previously described has a straight R134a female quick disconnect coupler 23, for connection to an R134a air conditioning or refrigeration system. Hose 24 is usually flexible. Threads 25 offers a means of attachment to the swivel arm 18 of FIG. 5.

Figure 29:
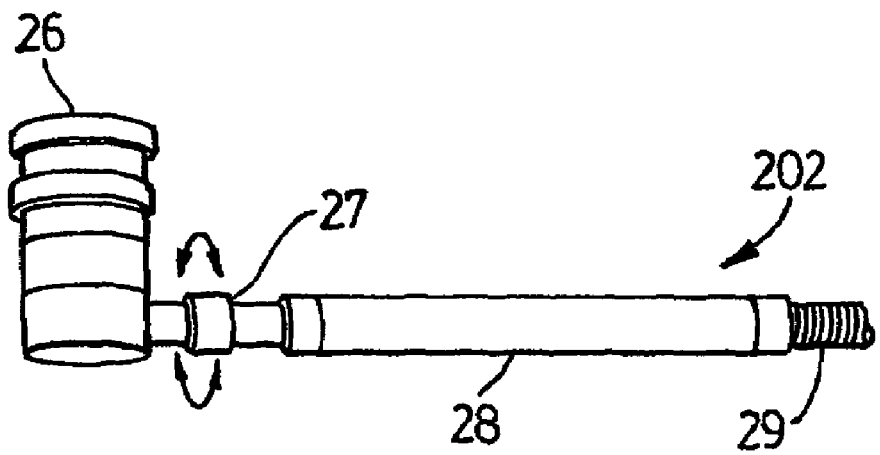
FIG. 29 is a perspective view of a 90 degree R134A hose subassembly of the hose assembly of FIGS. 20 through 23 for use with the swivel of FIGS. 24 and 25.

Referring to FIG. 29, a hose assembly portion 202 similar to that of FIG. 10 has a 90 degree R134a female quick disconnect coupler 26, for connection to an R134a air conditioning or refrigeration system. A shortened version of hose assembly portion that does not contain hose 28 is the inline, normal swivel adapter 569 of FIG. 15.

In all cases, preferably, swivel device 27 permits rotation of the fitting through 360 degrees but no less than 90 degrees in one direction.

Figure 30:
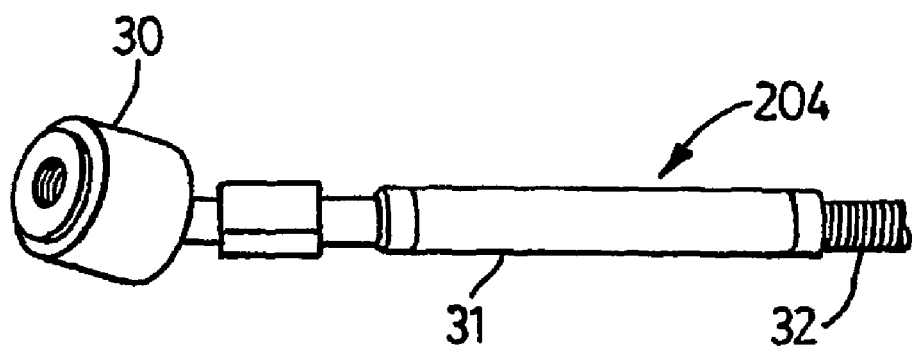
FIG. 30 is a perspective view of an R12/R22 hose subassembly of the hose assembly of FIGS. 20 through 23 for use with the swivel of FIGS. 24 and 25.

Referring to FIG. 30, a hose assembly portion 204 similar to that of FIGS. 10 and 11 with an R12, R22 female coupler 30 is for connection to an R12 or R22 air conditioning or refrigeration system.

The swivels 702, 704 can, for example, have the following embodiments:

1. The ability to rotate at a full 360 degrees but no less then 60 degrees from being parallel to the injector body.
2. The ability to rotate to being parallel with the injector body as in FIG. 7.
3. The swivel 702, 704 may have a ratcheting capability to maintain the hose at any desired position in the rotation.
4. The swivel 702, 704 may have a friction action capability to maintain the hose at any desired position in the rotation.
5. The swivel 702, 704 may have a manual type unlock and lock to any chosen position within its rotation capabilities.
6. The offset of swivel arm 18 of FIG. 20 can be sufficiently long enough to clear the injector 11 as shown in FIG. 22.
7. The swivel 702, 704 can have a check valve (see, for example, FIG. 24).

Other examples of fluid conduits for connection to an air conditioning or refrigeration system 502 that can utilize swivels to assist in the alignment of the conduit include vacuum pumps, recovery machines, and any service hose, port or fitting.

Figure 31:
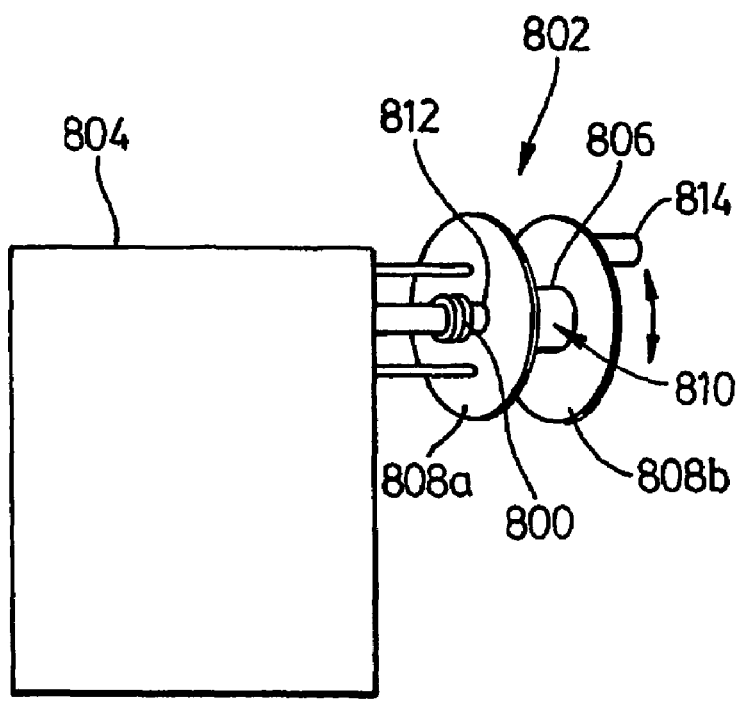
FIG. 31 is a partial perspective view of conduit portions with a recycling and recovery machine, swivel and hose reel in accordance with a preferred embodiment of the present invention.

Referring to FIG. 31, a swivel 800 can be used to create a hose reel 802 for manageable distribution and storage of hose (omitted in FIG. 31 for clarity) for use in a fluid conduit for connection to an air conditioning and refrigeration system, such as system 502 from previous FIGS. An example of a specific use of such a reel 802 includes a recycling and recovery machine 804 for recycling refrigerant and recovering lubricant from an air conditioning or refrigeration system 502.

The reel 802 has a cylindrical hose pick-up 806 with opposing walls 808. The hose pick-up 806 has a first port 810 through the hose pick-up 806 between the walls 808 for connection to a hose, not shown. The hose pick-up 806 has a second port 812 concentric with a rotational axis of the pick-up 806. The ports 810, 812 are in sealed fluid connection through the pick-up 806. The port 810 is coupled into swivel 800 which is in turn coupled into the remainder of the remainder of the recycling and recovery machine 804.

One wall 808a is fixed with respect to the remainder of the machine 808, while the pick-up 806 and the other wall 808b are free to rotate about the axis of the pick-up 806. The wall 808b may have a handle 814 that is offset from the axis of the pick-up 806 and is free to rotate with respect to the wall 808b. A hose, not shown, is connected to the port 810.

An operator can pull the hose from the reel 802 to manageably distribute the hose to any desired length. The hose can be retracted onto the reel 802 for storage by causing the wall 808b, and thus the pick-up 806, to rotate about the axis of the pick-up 806 using the handle 814 or otherwise. This causes the port 812 to move with the pick-up 806 and retract the hose. Alternatively, the reel 802 could be spring-loaded for automated retraction of the hose, making the handle 814 unnecessary. Preferably, the port 812 is angled to be parallel with the surface of the pick-up so that the hose or port 812 is not bent as the hose is retracted or distributed.

The swivel 800 rotates to allow the reel 802 to rotate about the axis of the pick-up 806. The swivel 800 could take many forms, including for example, an inline swivel, inline normal swivel or an offset dual normal swivel. An inline normal swivel is preferred for its strength and simplicity. Bushings may be utilized to lessen wear on the swivel 800.

Again, it is to be recognized that swivels can take many different forms, some of which have been described herein in detail. The design or selection of a swivel appropriate for any particular application will depend on many factors, including for example the pressures involved, the ease with which it is desired to rotate the swivel, and the amount of use and the forces to which the swivel will be subject. Each such form falls within the spirit and scope of the invention as defined by the claims, including without limitation equivalents of the forms described herein.

Figure 32:
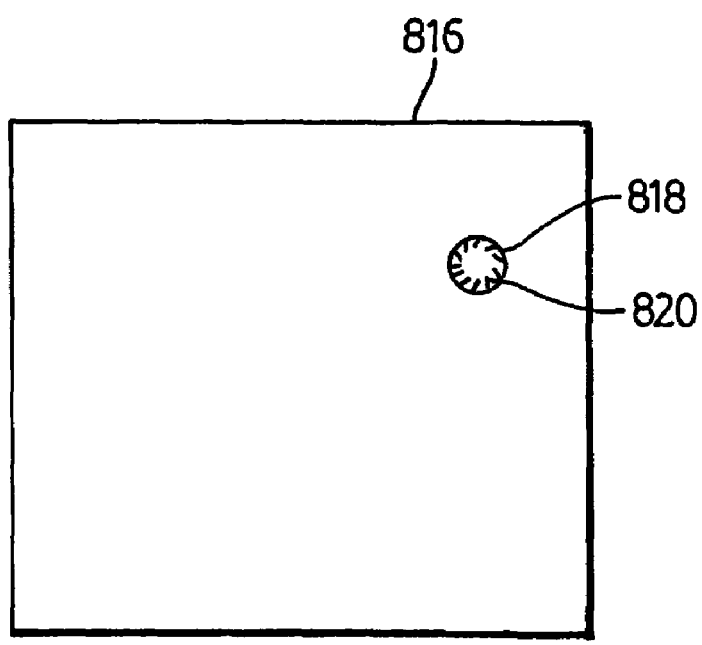
FIG. 32 is an external housing for a recycling and recovery machine in accordance with a preferred embodiment of the invention.

Referring to FIG. 32, the reel 802 of FIG. 31 can be integrated into the design of the machine 804 of FIG. 31 under an exterior housing 816 with an opening 820 for the hose to provide a neat appearance and for cleanliness and safety. The opening 816 can have bristles 818 or other material to brush off dirt or other debris from the hose as it is retracted. Alternatively, the reel 802 can be attached to the machine 804 with or without a separate housing having an opening for the hose, not shown. Such separate attachment of the reel 802 will be necessary in retrofit applications. The reel 802 can be attached at wall 808a by standoffs or the like to the machine 804.

Although reel 802 has been described in detail with reference to a recycling and recovery machine, the reel 802 could be incorporated in other components that could be incorporated into a conduit for connection to an air conditioning or refrigeration system. A hose reel 802 with swivel 800 can be built into other devices utilized in a conduit for connection to an air conditioning and refrigeration system.

The conduit 803 and reel 802 need not take the exact form described herein. The conduit 803 must have a swivel 800 in fluid connection with the reel 802 to permit rotation of part of the reel 802 that is in fluid connection with a hose, and the reel must reel in the hose as rotation of the swivel occurs in one direction, and the reel must permit reeling out of the hose as rotation occurs in another direction.

It will be understood by those skilled in the art that this description is made with reference to the preferred embodiment and that it is possible to make other embodiments employing the principles of the invention which fall within its spirit and scope as defined by the following claims.

What is claimed is:

1. An injection hose assembly for connection between an air conditioning or refrigeration system and a manual injector having a fluid containing portion for injecting fluids into the air conditioning or refrigeration system, the assembly comprising:
   a) a first fitting compatible with a fitting on the system,
   b) a second fitting compatible with the injector, the second fitting having an opening to which the injector can be connected,
   c) a substantially non-collapsing joint between the first fitting and the second fitting,
   d) a generally tubular hose between the first fitting and the joint, and
   e) an inline normal swivel providing fluid communication between the hose and the first fitting such that the hose has a first conduit fluid path and the first fitting has a second conduit fluid path, and the first conduit fluid path is normal to the second conduit fluid path, and the inline normal swivel permits relative rotation of the hose about the first conduit fluid path and relative rotation of the first fitting about the first conduit fluid path, wherein the first fitting, hose, joint and second fitting are connected to provide fluid connection between the first fitting and the second fitting, wherein the second fitting is offset from the hose and the joint permits at least two positions of the second fitting with respect to the hose when connected to the fluid containing portion of the injector, in the first position the second fitting opening is substantially aligned with the hose directed towards the first fitting and in the second position the second fitting opening is directed at 90 degrees to the hose, and the second fitting is offset from the hose by a distance sufficient to permit the hose and the injector to pass one another without bending the hose.

2. The assembly of claim 1 wherein the hose terminates in a third fitting, and wherein the first fitting and the inline normal swivel are comprised in a conduit adapter that further comprises a fourth fitting, and wherein the third fitting is sized to connect to an external pressure side fitting of an air conditioning or refrigeration system, the fourth fitting is sized to connect to the third fitting, and the inline normal swivel is between the fourth fitting and the first fitting.

3. An injection hose assembly for connection between an air conditioning or refrigeration system and a manual injector having a fluid containing portion for injecting fluids into the air conditioning or refrigeration system, the assembly comprising:
   a) a first fitting compatible with a fitting on the system,
   b) a second fitting compatible with the injector, the second fitting having an opening to which the injector can be connected,
   c) a substantially non-collapsible swivel joint between the first fitting and the second fitting,
   d) a generally tubular hose between the first fitting and the swivel joint, and
   e) an inline normal swivel providing fluid communication between the hose and the first fitting such that the hose has a first conduit fluid path and the first fitting has a second conduit fluid path, and the first conduit fluid path is normal to the second conduit fluid path, and the inline normal swivel permits relative rotation of the hose about the first conduit fluid path and relative rotation of the first fitting about the first conduit fluid path, wherein the first fitting, hose, swivel joint and second fitting are connected to provide fluid connection between the first fitting and the second fitting, wherein the second fitting is offset from the hose and the swivel joint permits rotation of the second fitting with respect to the hose between a first and a second position, in the first position the second fitting opening is substantially aligned with the hose directed towards the first fitting and in the second position the second fitting opening is directed at 90 degrees to the hose, and the second fitting is offset from the hose by a distance sufficient to permit the hose and the injector to pass one another without bending the hose.

4. The injection hose assembly of claim 3, wherein: the joint also permits rotation of the second fitting to a third position again substantially at 90 degrees to the first position, while the second fitting opening is directed in the opposite direction from the second position.

5. A method of connecting an injection hose assembly to an external fitting on an air conditioning system, the method comprising:

a. utilizing an injection hose assembly as set out in claim 3,
b. aligning the first fitting with the external fitting by manually swiveling the first fitting about the inline swivel, and
c. manually connecting the first fitting to the external fitting.

6. The method of claim 5 wherein aligning the first fitting and manually connecting the first fitting are performed using a single hand.

7. The method of claim 5 further comprising connecting the second fitting to an injector prior to connecting the injector hose assembly to the external fitting.

8. The assembly of claim 3 wherein the hose terminates in a third fitting, and wherein the first fitting and the inline normal swivel are comprised in a conduit adapter that further comprises a fourth fitting, and wherein the third fitting is sized to connect to an external pressure side fitting of an air conditioning or refrigeration system, the fourth fitting is sized to connect to the third fitting, and the inline normal swivel is between the fourth fitting and the first fitting.

\* \* \* \* \*